United States Patent
Yamamoto

(10) Patent No.: US 8,297,009 B2
(45) Date of Patent: Oct. 30, 2012

(54) SOLAR CELL MODULE

(75) Inventor: Daiki Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 84 days.

(21) Appl. No.: 12/999,156

(22) PCT Filed: Jun. 15, 2009

(86) PCT No.: PCT/JP2009/060859
§ 371 (c)(1),
(2), (4) Date: Dec. 15, 2010

(87) PCT Pub. No.: WO2009/154165
PCT Pub. Date: Dec. 23, 2009

(65) Prior Publication Data
US 2011/0088781 A1   Apr. 21, 2011

(30) Foreign Application Priority Data
Jun. 17, 2008 (JP) .................. 2008-158459

(51) Int. Cl.
*E04C 2/38* (2006.01)
*H01L 31/042* (2006.01)

(52) U.S. Cl. ............ 52/173.3; 52/656.9; 136/251

(58) Field of Classification Search ............ 52/173.3, 52/586.1, 209, 656.1, 656.9, 786.1, 786.13; 136/244, 251; 126/704
See application file for complete search history.

(56) References Cited

U.S. PATENT DOCUMENTS 4,584,804 A * 4/1986 Tajima ............ 52/235

(Continued)

FOREIGN PATENT DOCUMENTS

FR  2783862 A3 * 3/2000

(Continued)

OTHER PUBLICATIONS

Microfilm of the Specification and Drawings annexed to the Request of Japanese Utility Model Application 57-197652.
International Search Report for PCT/JP2009/060859, mailed Aug. 25, 2009.

(Continued)

*Primary Examiner* — Robert Canfield
*Assistant Examiner* — Brent W Herring
(74) *Attorney, Agent, or Firm* — Nixon & Vanderhye, P.C.

(57) ABSTRACT

To provide a solar cell module capable of discharging rain water or the like even when the solar cell module is installed outdoor such as on the roof, and rain water or the like flows into the solar cell module.

A solar cell module 1 includes a solar cell panel 9 having a primary side and a secondary side adjacent to the primary side, a primary frame member 10 disposed along the primary side, and a secondary frame member 20a disposed along the secondary side. The primary frame member 10 and the secondary frame member 20a include a holding unit that holds the solar cell panel 9. The primary frame member 10 includes, below the holding unit of the primary frame member 10, an end face 17a that is open at an end portion in a lengthwise direction of the primary frame member 10 and a primary interior space 17 communicating with the interior from the end face 17a. The secondary frame member 20a includes, below the holding unit of the secondary frame member 20a, a contact face 25a with which the end face 17a comes into contact and a recessed portion 28 that is spaced apart from the end face 17a such that the recessed portion 28 is recessed from the contact face 25a. A gap is formed between the end face 17a and the recessed portion 28, and the primary interior space 17 is in communication with the exterior via the gap.

9 Claims, 24 Drawing Sheets

U.S. PATENT DOCUMENTS

| | | | |
|---|---|---|---|
| 4,689,933 A * | 9/1987 | Biro | 52/656.5 |
| 6,098,355 A * | 8/2000 | Li | 52/212 |
| 7,012,188 B2 * | 3/2006 | Erling | 136/251 |
| 7,406,800 B2 * | 8/2008 | Cinnamon et al. | 52/173.3 |
| 8,057,120 B2 * | 11/2011 | Wernlund et al. | 403/187 |
| 2010/0243035 A1 * | 9/2010 | Nakamura | 136/251 |
| 2011/0120529 A1 * | 5/2011 | Nakamura | 136/251 |

FOREIGN PATENT DOCUMENTS

| | | |
|---|---|---|
| JP | 08-083921 | 3/1996 |
| JP | 09-096071 | 4/1997 |
| JP | 10153051 A * | 6/1998 |
| JP | 10-308522 | 11/1998 |
| JP | 11-325610 | 11/1999 |
| JP | 2001-230440 | 8/2001 |
| JP | 2009059947 A * | 3/2009 |
| JP | 2009060058 A * | 3/2009 |
| JP | 2009135304 A * | 6/2009 |

OTHER PUBLICATIONS

Microfilm of the Specification and Drawings annexed to the Request of Japanese Utility Model Application No. 32638/1983, Sep. 14, 1984.

Microfilm of the Specification and Drawings annexed to the Request of Japanese Utility Model Application No. 46130/1982, Oct. 29, 1983.

Microfilm of the Specification and Drawings annexed to the Request of Japanese Utility Model Application No. 109155/1986, Jul. 10, 1986.

Microfilm of the Specification and Drawings annexed to the Request of Japanese Utility Model Application No. 127650/1986, Aug. 11, 1986.

Microfilm of the Specification and Drawings annexed to the Request of Japanese Utility Model Application 197652.

* cited by examiner

SOLAR CELL MODULE

This application is the U.S. national phase of International Application No. PCT/JP2009/060859, filed 15 Jun. 2009, which designated the U.S. and claims priority to Japanese Patent Application No. 2008-158459, filed 17 Jun. 2008, the entire contents of each of which are hereby incorporated by reference.

TECHNICAL FIELD

The present invention relates to a solar cell module that holds a solar cell panel so as to surround that solar cell panel using a frame member.

BACKGROUND ART

Generally, solar cell modules are made up of a rectangular solar cell panel and a frame member that holds the solar cell panel. Frame members having various types of structures for use in such solar cell modules are known.

As an example of a frame member structure, a frame member having a structure including an outer wall formed vertically along one side of a solar cell panel and a holding unit that is formed horizontally in an upper portion of the outer wall and that has a U-shaped cross section is known.

A solar cell module including the frame member employs a structure in which a solar cell panel is sandwiched by fitting a side of the solar cell panel into the holding unit having a U-shaped cross section of the frame member (see, for example, FIG. 2 of Patent Document 1).

In the solar cell module disclosed in Patent Document 1, the frame member includes, in addition to the solar cell panel sandwiching portion having a U-shaped cross section, an outer frame portion and an inner frame portion formed so as to extend downward from the solar cell panel sandwiching portion, and flange portions formed so as to be bent toward the inside at respective lower ends of the outer frame portion and the inner frame portion.

In the solar cell module structure disclosed in Patent Document 1, there is a space between the outer frame portion and the inner frame portion, but because an opening portion is present between the flange portion of the outer frame portion and the flange portion of the inner frame portion, the space is in communication with the exterior via the opening portion.

In this solar cell module, in order to attach the solar cell module onto a mounting base, a fitting is used that presses, from above, both the flange portion of the outer frame portion and the flange portion of the inner frame portion to attach the solar cell module onto the mounting base. In this case, this fitting is fixed to the mounting base with a bolt so as to attach the solar cell module onto the mounting base.

In the solar cell module having the above structure, as described above, in order to attach the solar cell module onto a mounting base, the fitting that presses the flange portion of the outer frame portion and the flange portion of the inner frame portion of the solar cell module is fixed to the mounting base. When an attempt is made to enhance the attachment strength of the solar cell module, it is necessary to increase the strength of the outer frame portion, the inner frame portion and the flange portions, that is to say, reinforcement is necessary such as increasing the thickness of these members.

However, the method of increasing the strength of the members by increasing the thickness of the members as described above can lead to increased size and weight of the solar cell module, and thus it cannot be said that this method is a beneficial countermeasure.

Under such circumstances, a method of increasing the strength of the members without using the above-described method of increasing the thickness of the members has been conceived and is generally in wide use. This method uses, for example, a frame member that is made up of an outer frame portion, an inner frame portion and a bottom portion, and that is internally provided with a hollow space portion. In a solar cell module using such a frame member that is internally provided with a hollow space portion, there is a space between the outer frame portion and the inner frame portion, but the space is closed by the bottom portion.

As used throughout this specification, in a solar cell module that holds the periphery of a solar cell panel using a frame member, the term "inside" means a "side on which the solar cell panel is present", and the term "outside" means a side that is opposite to the "inside", or in other words, a "side opposite to the side on which the solar cell panel is present".

PRIOR ART DOCUMENT

Patent Document

[Patent Document 1] JP S57-197652Y

SUMMARY OF INVENTION

Problems to be Solved by the Invention

In order to use sunlight without waste, solar cell modules are installed in outdoor installation locations such as roofs. When a solar cell module is installed in an outdoor installation location such as a roof, the solar cell module is exposed to rain while raining. For this reason, a situation frequently occurs in which rain water enters the frame member of the solar cell module.

In such a situation, in the case of the solar cell module disclosed in Patent Document 1 in which there is a space between the outer frame portion and the inner frame portion, because an opening portion is present between the flange portion of the outer frame portion and the flange portion of the inner frame portion, the space is in communication with the exterior via the opening portion, and thus rain water that has entered the space between the outer frame portion and the inner frame portion of the solar cell module of Patent Document 1 can be discharged to the external environment through the opening portion.

However, in the case of the solar cell module using the frame member that is made up of an outer frame portion, an inner frame portion and a bottom portion whose strengths have been increased without using the method of increasing the thickness of the members, and that is internally provided with a hollow space portion, there is a space between the outer frame portion and the inner frame portion, but the space is closed by the bottom portion. Accordingly, it is difficult to discharge rain water that has entered the space between the outer frame portion and the inner frame portion to the external environment, and there is a possibility that, during winter seasons or the like, the rain water that has entered the space between the outer frame portion and the inner frame portion might freeze, causing damage to the solar cell module.

In view of the above, the present invention has been conceived to improve such situations, and the present invention provides a solar cell module capable of discharging rain water or the like even when the solar cell module is installed outdoor such as on the roof, and rain water or the like flows into the solar cell module.

Means for Solving the Problems

A solar cell module according to the present invention is a solar cell module including a solar cell panel having a primary side and a secondary side adjacent to the primary side, a primary frame member disposed along the primary side, and a secondary frame member disposed along the secondary side. As the frame members, generally, a pair of primary frame members and a pair of secondary frame members adjacent to the primary frame members are used.

In the above-described solar cell module, the primary frame member and the secondary frame member include a holding unit that holds the solar cell panel. The primary frame member includes, below the holding unit of the primary frame member, an end face that is open at an end portion in a lengthwise direction of the primary frame member and a primary interior space communicating with the interior from the opening of the end face, and the secondary frame member includes, below the holding unit of the secondary frame member, a contact face with which the end face of the primary frame member comes into contact and a recessed portion that is spaced apart from the end face of the primary frame member such that the recessed portion is recessed from the contact face.

In addition, a gap is formed between the end face of the primary frame member and the recessed portion of the secondary frame member, and the primary interior space is in communication with the exterior via the gap.

With the above-described solar cell module, the secondary frame member of the solar cell module includes a contact face with which the end face, which is open, of the primary frame member comes into contact and a recessed portion that is spaced apart from the end face such that the recessed portion is recessed from the contact face. Also, a gap is formed between the recessed portion and the open end face of the primary frame member, and the primary interior space is in communication with the exterior via the gap.

Accordingly, the solar cell module acts as follows when installed, for example, with one of the pair of secondary frame members being positioned above the other, in an inclined location such as a roof.

That is to say, even when rain water or the like flows into the primary interior space of the primary frame member disposed at an incline, because the primary interior space is in communication with the exterior via the gap formed between the end face of the primary frame member and the recessed portion of the secondary frame member as described above, it is possible to discharge the rain water or the like that has flowed into the primary interior space of the primary frame member to the exterior via the gap.

Accordingly, even when the above-described solar cell module is installed outdoor such as on the roof, and rain water or the like flows into the solar cell module, the rain water that has flowed into the solar cell module can be discharged.

In the above-described solar cell module, the recessed portion of the secondary frame member may be provided so as to include a position that a substantially vertical central portion of the end face of the primary frame member faces. With this configuration, it is possible to form a vertically wide recessed portion, thus widening the gap. Accordingly, rain water or the like that has flowed into the primary interior space of the primary frame member can be easily discharged to the exterior.

Alternatively, the recessed portion may be provided below a lower end of the contact face of the secondary frame member. In this case, the recessed portion may be formed so as to be chamfered obliquely downward from the lower end of the contact face.

With this configuration, a gap having a triangular cross section is formed between the end face of the primary frame member and the recessed portion of the secondary frame member.

Accordingly, rain water or the like that has flowed into the primary interior space of the primary frame member can be discharged to the exterior via the gap. Therefore, even when the above-described solar cell module is installed outdoor such as on the roof, and rain water or the like flows into the solar cell module, the rain water or the like that has flowed into the solar cell module can be discharged.

The above-described solar cell module may be configured as follows. Specifically, the secondary frame member may be internally provided with a secondary interior space, and a through hole may be provided in the recessed portion so as to bring the secondary interior space into communication with the primary interior space of the primary frame member.

This configuration acts as follows by combining it with a through hole provided in a bottom portion of the secondary frame member, which will be described below. That is to say, when rain water or the like flows into the primary interior space of the primary frame member, it is possible to cause the rain water or the like flowing in the primary interior space to flow into the secondary interior space of the secondary frame member through the through hole provided in the recessed portion, and also possible to cause the rain water or the like that has flowed into the secondary interior space to be discharged to the external environment through the through hole provided in the bottom portion of the secondary frame member, which will be described later.

Accordingly, even when the above-described solar cell module is installed outdoor such as on the roof, and rain water or the like flows into the solar cell module, the rain water or the like that has flowed into the solar cell module can be discharged.

The above-described solar cell module may be configured as follows. Specifically, the secondary frame member may be provided with a through hole in bottom portion thereof so as to bring the secondary interior space into communication with the exterior.

With this configuration, even when rain water or the like flows into the solar cell module and into the secondary interior space of the secondary frame member of the solar cell module, the rain water or the like that has flowed thereinto can be discharged to the external environment via the through hole formed in the bottom portion.

Also, as described above, when rain water or the like flows into the primary interior space of the primary frame member, it is possible to cause the rain water or the like flowing in the primary interior space to flow into the secondary interior space of the secondary frame member through the through hole provided in the recessed portion, and also possible to cause the rain water or the like that has flowed into the secondary interior space to be discharged to the external environment through the through hole provided in the bottom portion of the secondary frame member.

Accordingly, even when the above-described solar cell module is installed outdoor such as on the roof, and rain water or the like flows into the solar cell module, the rain water that has flowed into the solar cell module can be discharged.

In the above-described solar cell module, the secondary frame member may be open on a side opposite to the contact face.

With this configuration, the secondary interior space of the secondary frame member is not a sealed space, and thus rain water or the like that has flowed into the secondary interior space of the secondary frame member can be discharged through the open portion.

Also, when rain water or the like flows into the primary interior space of the primary frame member, it is possible to cause the rain water or the like flowing in the primary interior space to flow into the secondary interior space of secondary frame member through the through hole provided in the recessed portion of the secondary frame member, and also possible to cause the rain water or the like that has flowed into the secondary interior space to be discharged to the external environment through an open portion of the secondary frame member.

Accordingly, even when the above-described solar cell module is installed outdoor such as on the roof, and rain water or the like flows into the solar cell module, the rain water that has flowed into the solar cell module can be discharged.

Effects of the Invention

According to the present invention, the secondary frame member of the solar cell module includes a contact face with which the end face, which is open to communicate with the primary interior space, of the primary frame member comes into contact and a recessed portion that is spaced apart from the end face of the primary frame member such that the recessed portion is recessed from the contact face. Also, a gap is formed between the recessed portion and the end face of the primary frame member, and the primary interior space is in communication with the exterior via the gap.

Therefore, according to the solar cell module of the present invention, in the case where the solar cell module is installed, with one of the pair of secondary frame members being positioned above the other, in an inclined location such as a roof, for example, even when rain water or the like flows into the primary interior space of the primary frame member disposed at an incline, the primary interior space is in communication with the exterior via the gap between the end face of the primary frame member and the recessed portion of the secondary frame member, and it is therefore possible to discharge the rain water or the like that has flowed into the primary interior space of the primary frame member to the exterior via the gap.

Accordingly, even when the solar cell module is installed outdoor such as on the roof, and rain water or the like flows into the solar cell module, the rain water or the like that has flowed into the solar cell module can be discharged.

MODES FOR CARRYING OUT THE INVENTION

Next, solar cell modules according to embodiments of the present invention will be described with reference to the drawings. In the description given herein, solar cell modules according to three embodiments, namely, Embodiments 1 to 3, will be described.

Embodiment 1

Figure 1:
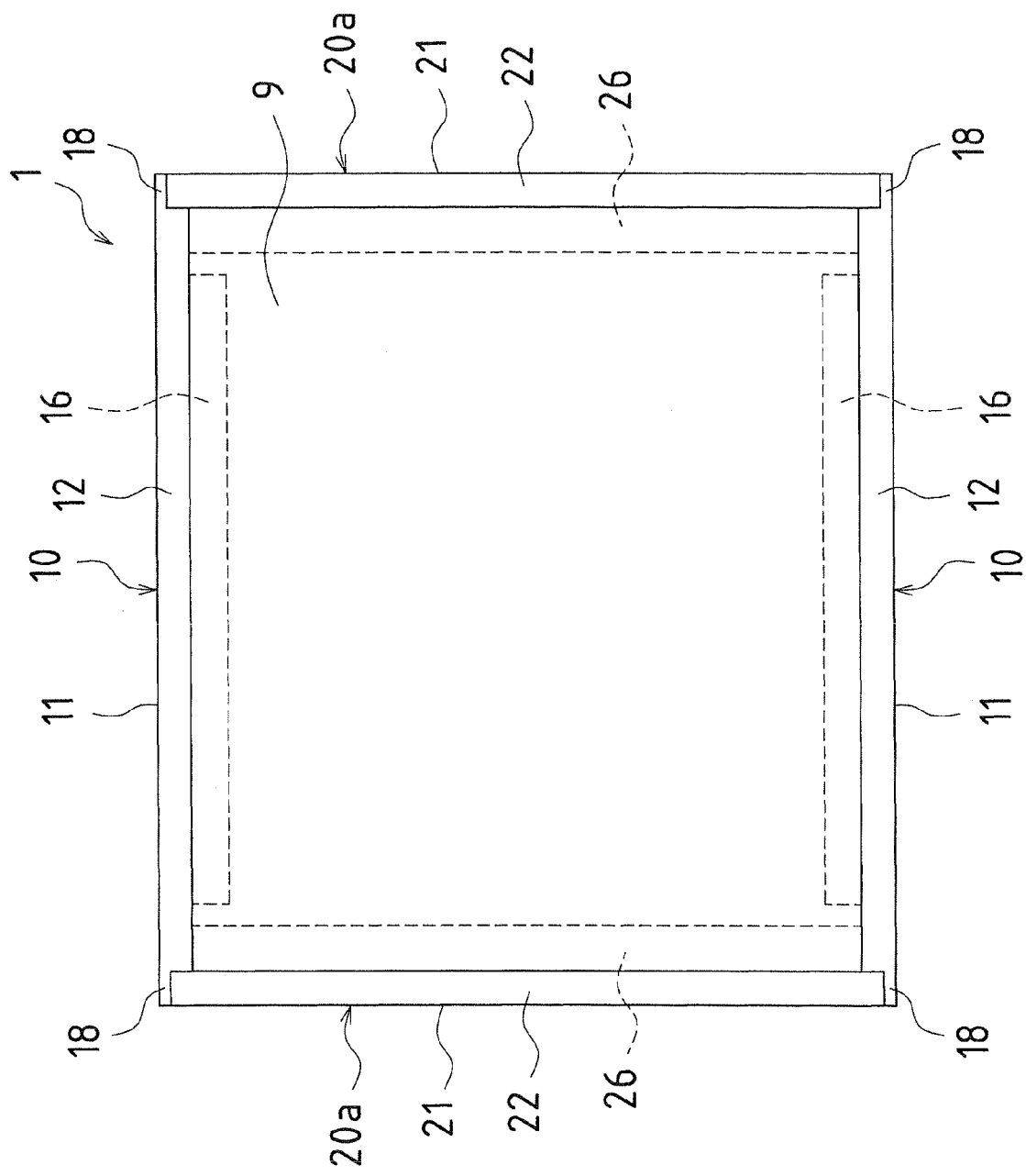
FIG. 1 is a plan view of a solar cell module according to Embodiment 1.

FIG. 1 is a plan view of a solar cell module 1 according to Embodiment 1. The solar cell module 1 according to Embodiment 1 is primarily made up of a pair of primary frame members 10 and a pair of secondary frame members 20a, which together constitute a frame member, and a solar cell panel 9.

Figure 2:
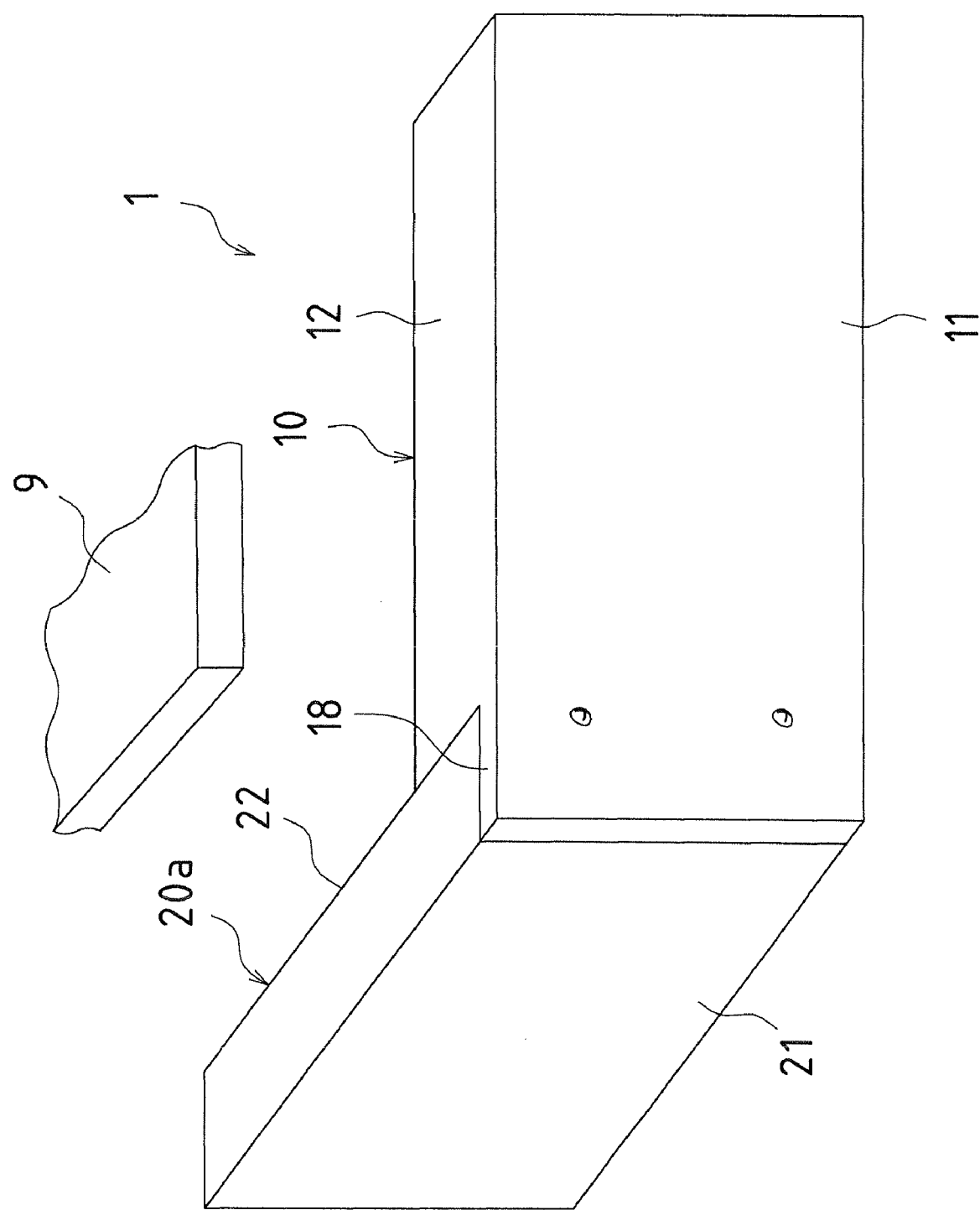
FIG. 2 is a partial perspective view of a frame member of the solar cell module according to Embodiment 1 as viewed from the outside.
Figure 3:
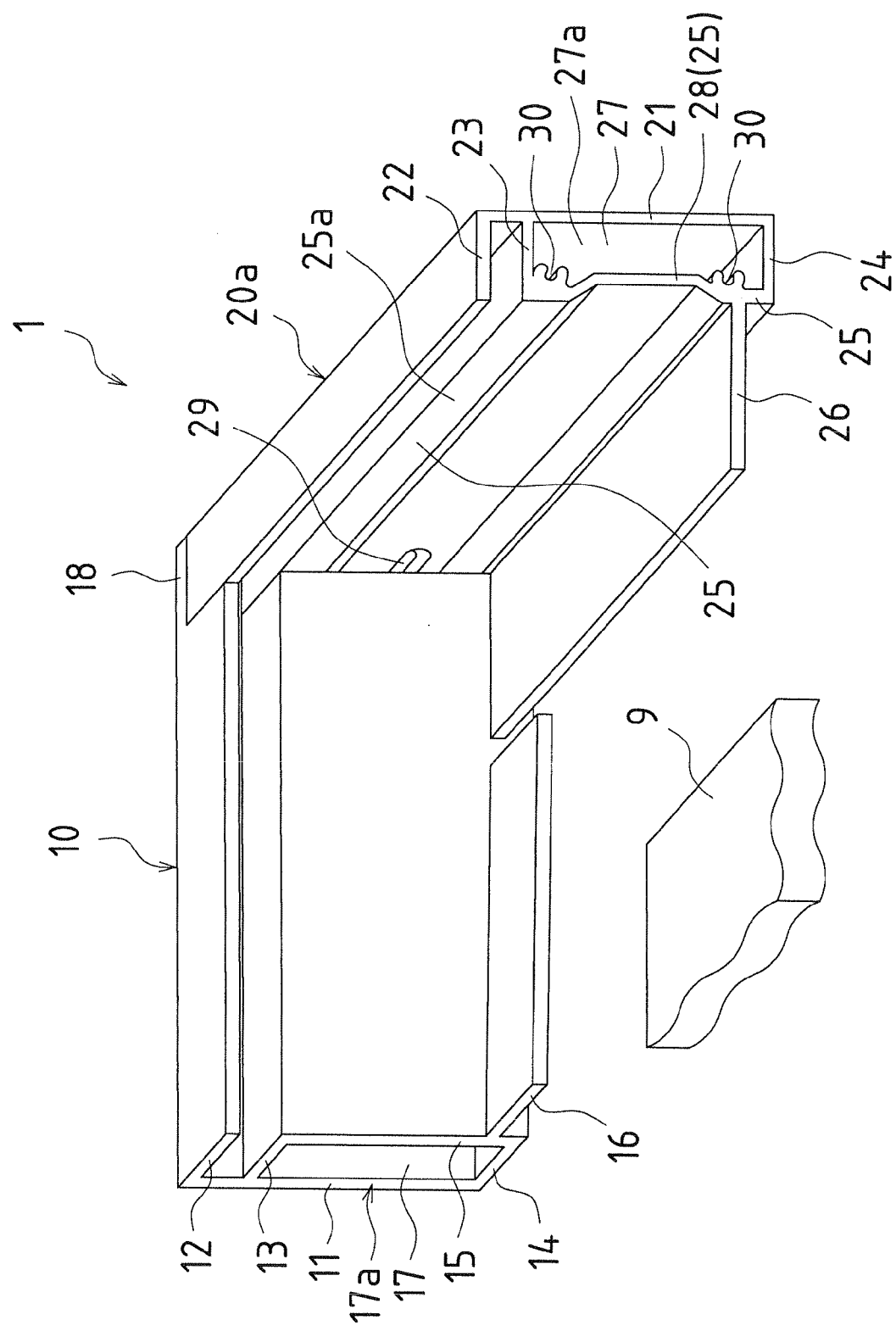
FIG. 3 is a partial perspective view of the frame member of the solar cell module according to Embodiment 1 as viewed from the inside.
Figure 4:
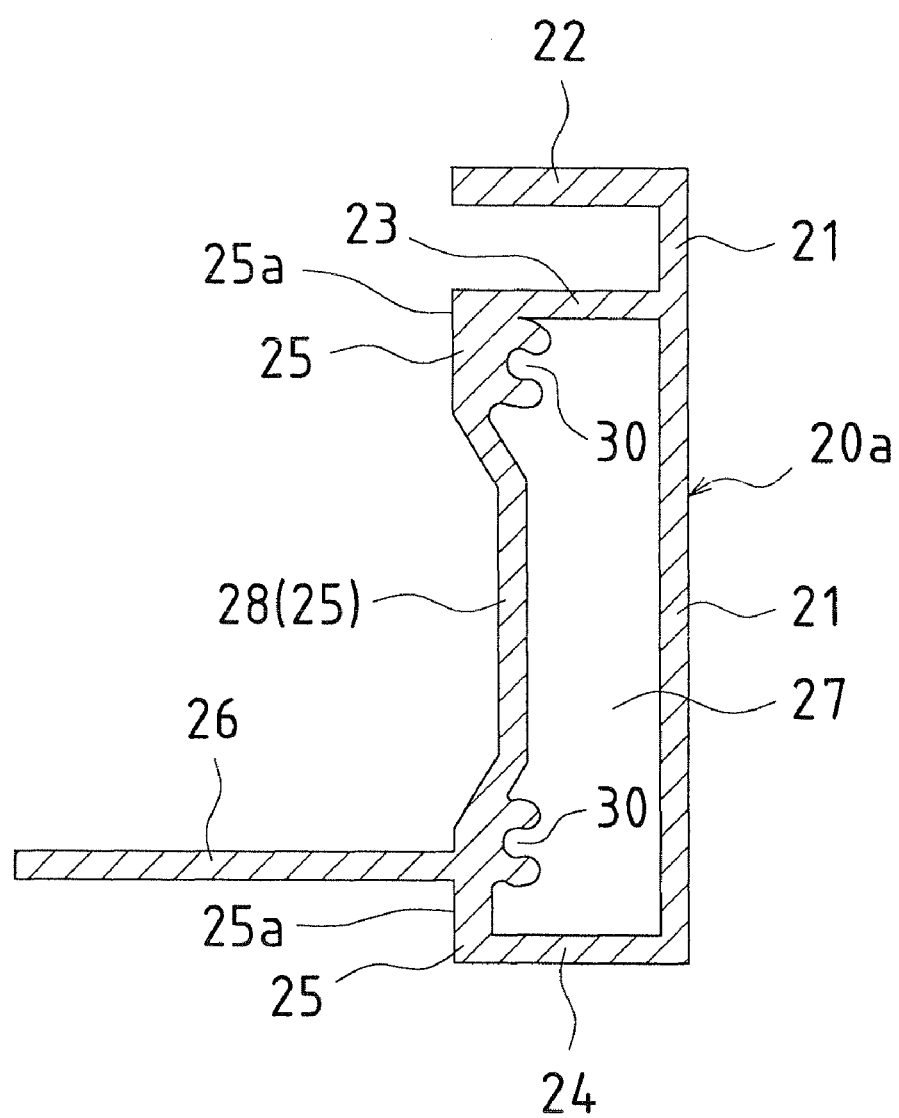
FIG. 4 is a cross-sectional view of a secondary frame member of the solar cell module according to Embodiment 1.
Figure 5:
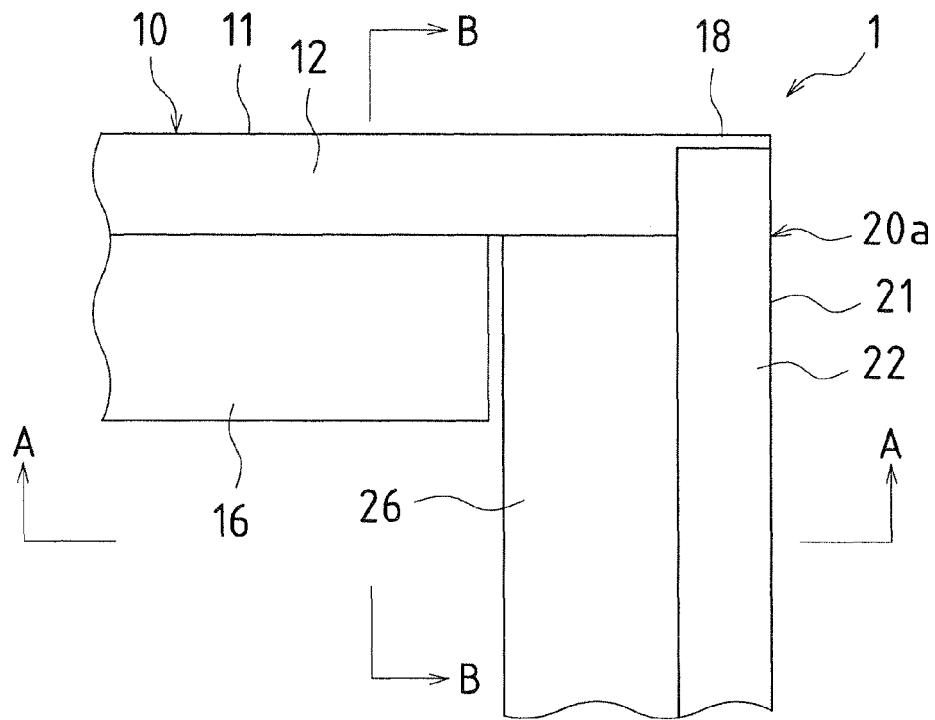
FIG. 5 is a partial plan view of the frame member of the solar cell module according to Embodiment 1.
Figure 6:
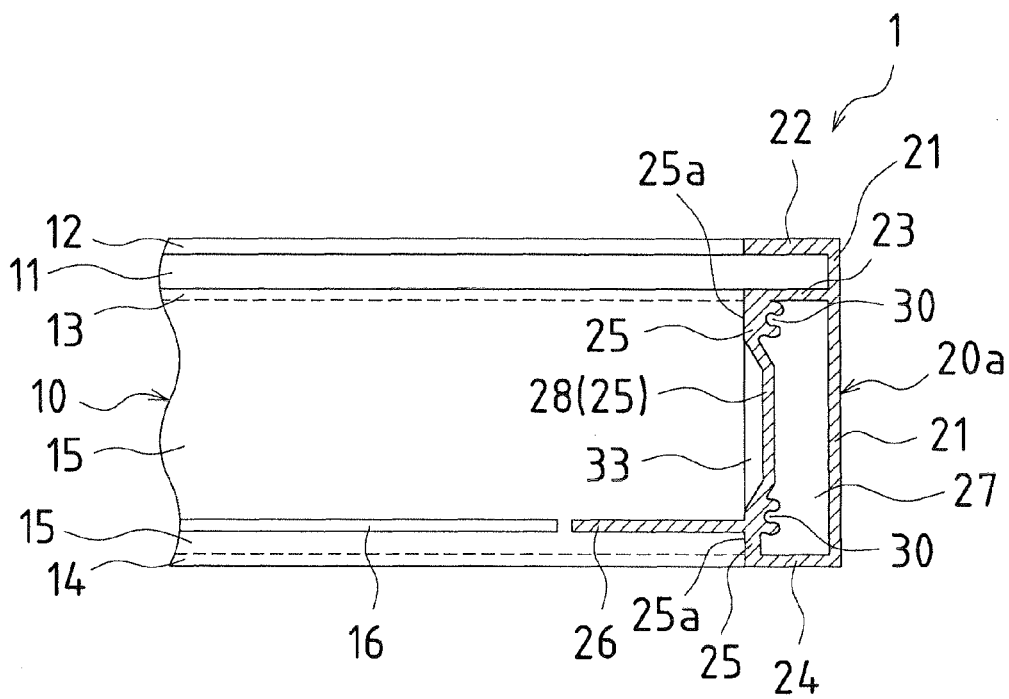
FIG. 6 is a side view including a cross section taken along the line A-A of FIG. 5.
Figure 7:
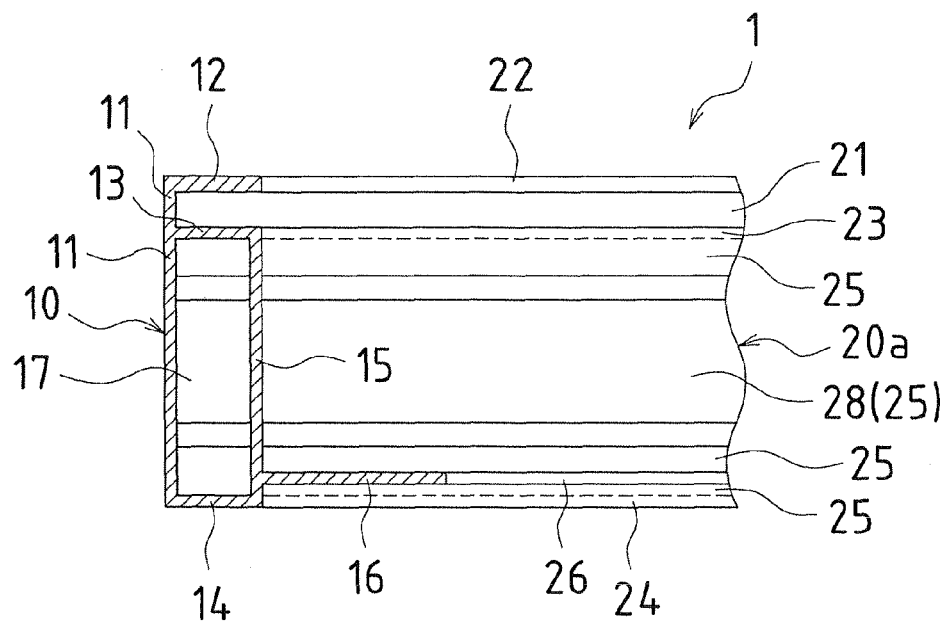
FIG. 7 is a side view including a cross section taken along the line B-B of FIG. 5.
Figure 8:
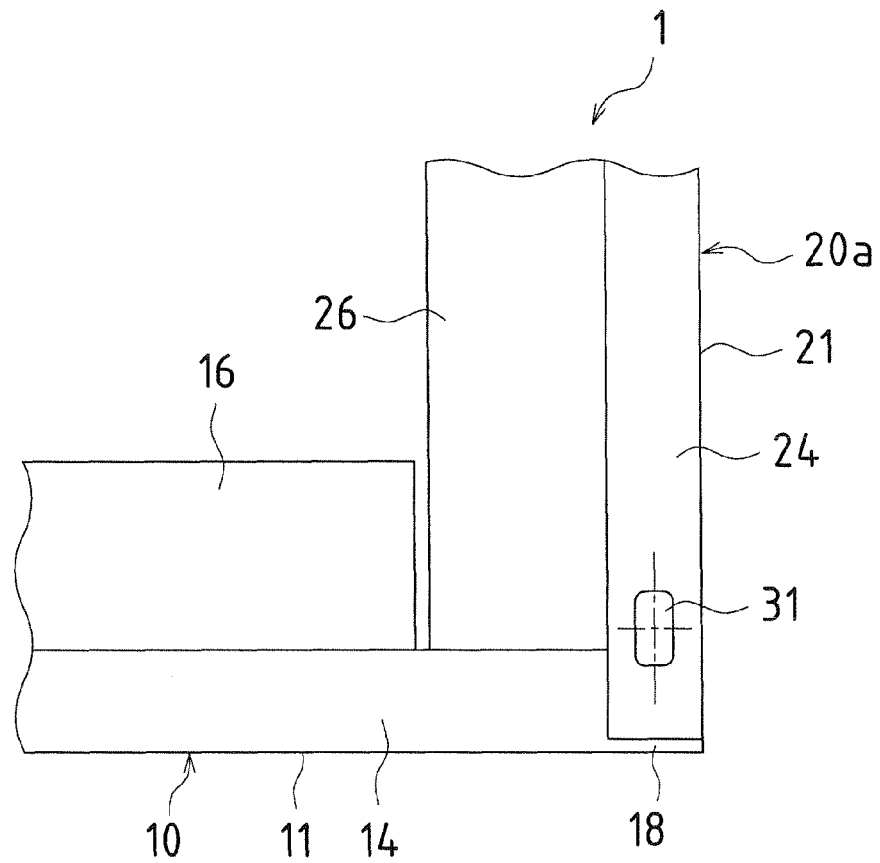
FIG. 8 is a partial bottom view of the frame member of the solar cell module according to Embodiment 1.
Figure 9:
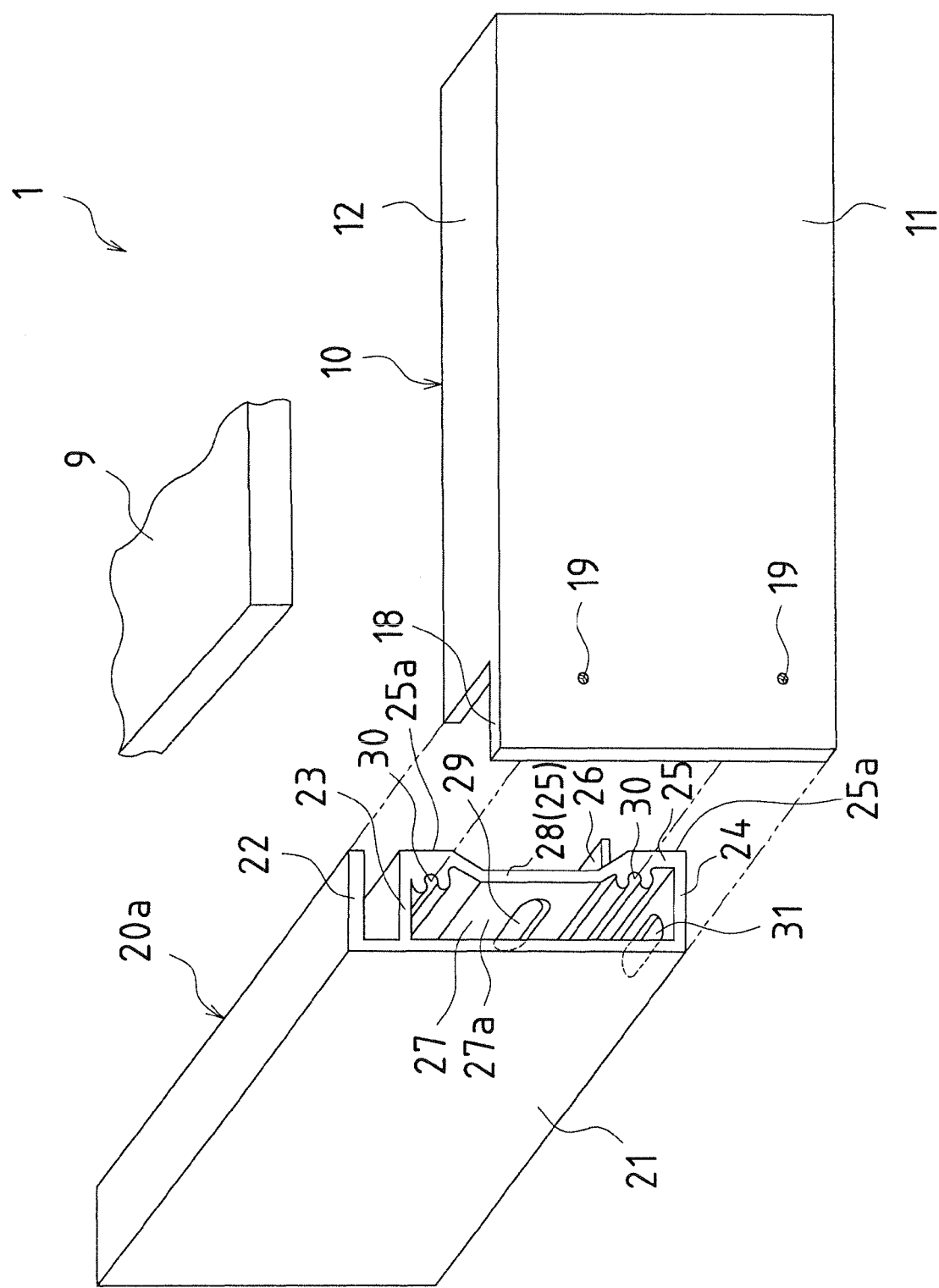
FIG. 9 is a partially exploded perspective view of the solar cell module according to Embodiment 1 as viewed from the outside.
Figure 10:
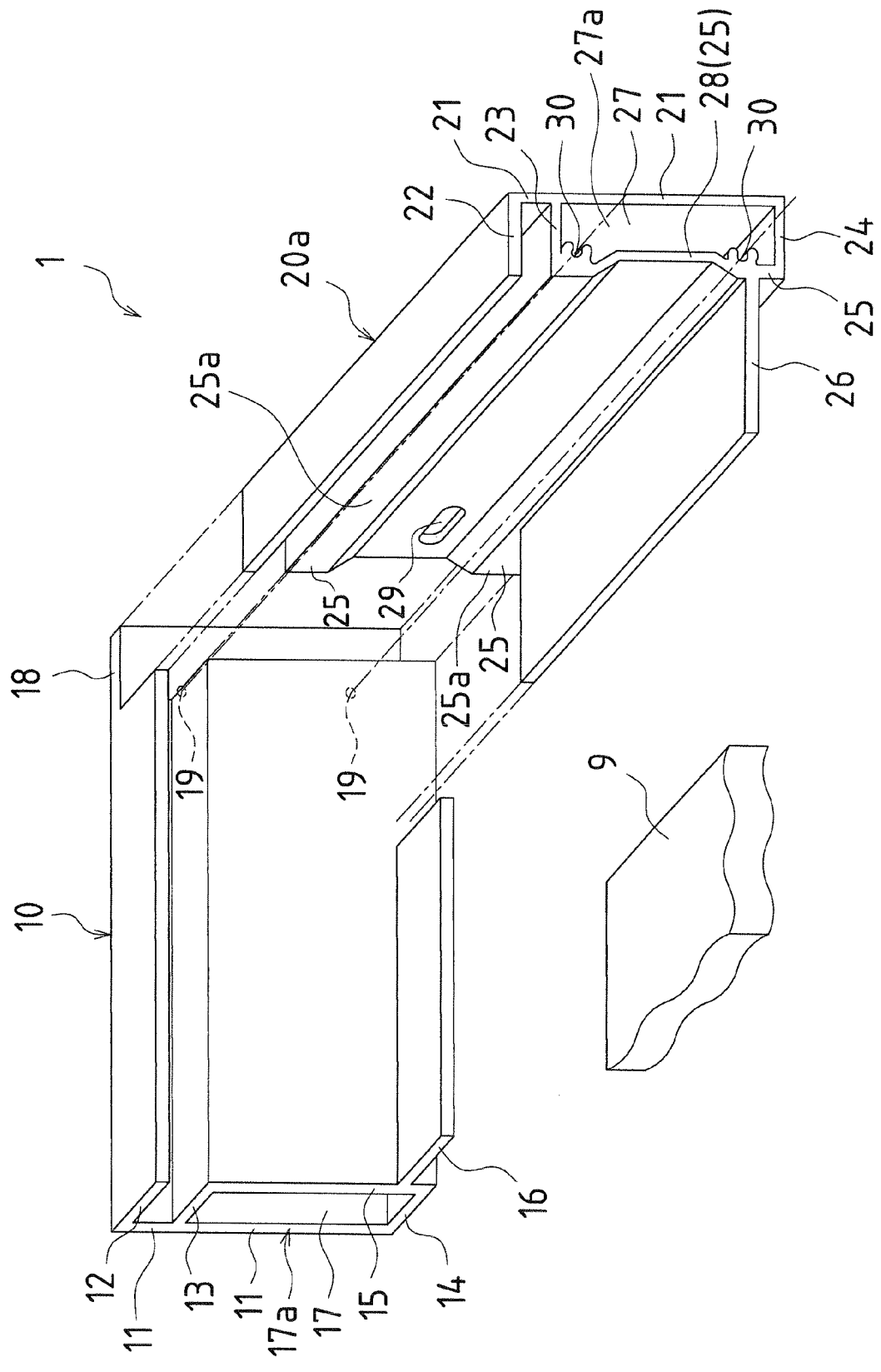
FIG. 10 is a partially exploded perspective view of the solar cell module according to Embodiment 1 as viewed from the inside.

FIG. 2 is a partial perspective view of the frame member of the solar cell module 1 of Embodiment 1 as viewed from the outside. FIG. 3 is a partial perspective view of the frame member as viewed from the inside. FIG. 4 is a cross-sectional view of the secondary frame member 20a. FIG. 5 is a partial plan view of the frame member. FIG. 6 is a side view including a cross section taken along the line A-A of FIG. 5. FIG. 7 is a side view including a cross section taken along the line B-B of FIG. 5. FIG. 8 is a partial bottom view of the frame member. FIG. 9 is a partially exploded perspective view of the solar cell module 1 as viewed from the outside. FIG. 10 is a partially exploded perspective view of the solar cell module 1 as viewed from the inside.

The solar cell module 1 of Embodiment 1 has the following structure. Specifically, in FIGS. 1 to 10, the solar cell panel 9 has a rectangular shape, and the solar cell panel 9 is held by a pair of primary frame members 10 holding primary sides of the solar cell panel 9 and a pair of secondary frame members 20a holding secondary sides adjacent to the primary sides.

The primary frame members 10 are each made up of a primary outer wall 11, a primary upper holding piece 12, a primary lower holding piece 13, a primary bottom piece 14, a primary inner wall 15 and a primary base piece 16 as shown in FIG. 3 for example. The primary outer wall 11 is formed along the primary side of the solar cell panel 9. The primary upper holding piece 12 and the primary lower holding piece 13 are provided one above the other inside an upper portion of the primary outer wall 11 so as to extend toward the inside for substantially the same length. The solar cell panel 9 is fitted into and held between the primary upper holding piece 12 and the primary lower holding piece 13. In other words, the primary frame member 10 includes, on an upper side, the primary upper holding piece 12 and the primary lower holding piece 13 as a holding unit holding the solar cell panel 9.

The primary bottom piece 14 is formed inside a lower end of the primary outer wall 11 so as to extend toward the inside along the primary outer wall 11. The primary inner wall 15 is formed between the primary bottom piece 14 and the primary lower holding piece 13, and in the present embodiment, as an example, the primary inner wall 15 is formed so as to connect an extremity of the primary bottom piece 14 and an extremity of the primary lower holding piece 13. Other than this shape, the primary inner wall 15 may be formed to, for example, extend downward from an intermediate location of the lower surface of the primary lower holding piece 13 so that the extremity of the primary lower holding piece 13 protrudes.

The primary base piece 16 is formed inside a lower portion of the primary inner wall 15 so as to extend toward the inside along the primary inner wall 15. The primary base piece 16 has the effect of increasing the torsional strength of the primary frame member 10, and in the present embodiment, it is presented as an example of a frame reinforcement. The primary bottom piece 14 and the primary base piece 16 may be formed continuously. If the primary frame member 10 has a sufficient strength, the primary base piece 16 may be omitted.

As shown in FIG. 3 for example, a space surrounded by the primary outer wall 11, the primary lower holding piece 13, the primary inner wall 15 and the primary bottom piece 14 is formed in the primary frame member 10, and this space is referred to as a "primary interior space 17". In other words, the primary frame member 10 includes, below the holding unit constituted by the primary upper holding piece 12 and the primary lower holding piece 13, an end face 17a that is open at an end portion in the lengthwise direction of the primary frame member 10 and the primary interior space 17 communicating with the interior from the opening of the end face.

The secondary frame members 20a described above are each made up of a secondary outer wall 21, a secondary upper holding piece 22, a secondary lower holding piece 23, a secondary bottom piece 24, a secondary inner wall 25 and a secondary base piece 26 as shown in FIGS. 3 and 4 for example. The secondary outer wall 21 is formed along the secondary side of the solar cell panel 9. The secondary upper holding piece 22 and the secondary lower holding piece 23 are provided one above the other inside an upper portion of the secondary outer wall 21 so as to extend toward the inside for substantially the same length. The solar cell panel 9 is fitted into and held between the secondary upper holding piece 22 and the secondary lower holding piece 23. In other words, the secondary frame member 20a includes, on an upper side, the secondary upper holding piece 22 and the primary lower holding piece 23 as a holding unit holding the solar cell panel 9.

The secondary bottom piece 24 is formed inside a lower end of the secondary outer wall 21 so as to extend toward the inside along the secondary outer wall 21. The secondary inner wall 25 is formed between the secondary bottom piece 24 and the secondary lower holding piece 23, and in the present embodiment, as an example, the secondary inner wall 25 is formed so as to connect an extremity of the secondary bottom piece 24 and an extremity of the secondary lower holding piece 23. Other than this shape, the secondary inner wall 25 may be formed to, for example, extend downward from an intermediate location of the lower surface of the secondary lower holding piece 23 so that the extremity of the secondary lower holding piece 23 protrudes.

The secondary base piece 26 is formed inside a lower portion of the secondary inner wall 25 so as to extend toward the inside along the secondary inner wall 25. The secondary base piece 26 has the effect of increasing the torsional strength of the secondary frame member 20a, and in the present embodiment, it is presented as an example of a frame reinforcement. The secondary bottom piece 24 and the secondary base piece 26 may be formed continuously. If the secondary frame member 20a has a sufficient strength, the secondary base piece 26 may be omitted.

In the secondary frame member 20a, as shown in FIG. 3 for example, a space surrounded by the secondary outer wall 21, the secondary lower holding piece 23, the secondary inner wall 25 and the secondary bottom piece 24 is formed, and this space is referred to as a "secondary interior space 27". In other words, the secondary frame member 20a is internally provided with the secondary interior space 27.

In the solar cell module 1 described above, as shown in FIGS. 9 and 10, at an end portion of the primary outer wall 11 of the primary frame member 10, the primary upper holding piece 12, the primary lower holding piece 13, the primary bottom piece 14, the primary inner wall 15 and the primary base piece 16 have been removed from an edge of the primary outer wall 11 by a width equal to the extension length of the secondary upper holding piece 22, the secondary lower holding piece 23 and the secondary bottom piece 24 of the secondary frame member 20a, and thereby a flat primary outer wall end portion 18 is formed at the end portion of the primary outer wall 11.

An end face at an end portion of the secondary frame member 20a is brought into contact with an interior face of the primary outer wall end portion 18, and the primary frame member 10 and the secondary frame member 20a of the solar cell module 1 are bonded with screws using screw holes 19 and screw holders 30.

Because the end face at the end portion of the secondary frame member 20a is in contact with the interior face of the primary outer wall end portion 18, an opening portion 27a of the secondary interior space 27 of the secondary frame member 20a is in contact with the interior face of the primary outer wall end portion 18. Accordingly, in this state, the secondary interior space 27 of the secondary frame member 20a is a sealed space.

However, in practice, in the solar cell module 1 described above, as will be described later, a secondary inner wall recessed portion through hole 29 and a secondary bottom piece through hole 31 are formed in the secondary frame member 20a, and thus the secondary interior space 27 is not sealed and is in communication with the exterior.

An end portion of the primary base piece 16 of the primary frame member 10 has been removed as shown in FIG. 10 so that the secondary base piece 26 of the secondary frame member 20a and the primary base piece 16 of the primary frame member 10 do not abut against each other.

In the solar cell module 1 described above, as shown in FIGS. 3, 9 and 10 for example, in the secondary inner wall 25 of the secondary frame member 20a, which includes a portion that is in contact with the end face 17a of the primary frame member 10, a secondary inner wall middle recessed portion 28 where part of the secondary inner wall 25 is recessed toward the secondary interior space 27 is formed across the secondary inner wall 25 along the longitudinal direction of the secondary inner wall 25 at a position above the extension position of the secondary base piece 26. The secondary inner wall middle recessed portion 28 corresponds to the recessed portion mentioned earlier.

The end face 17a of the primary frame member 10 is in contact with the interior face of the secondary inner wall 25 as described above. In other words, the secondary frame member 20a includes, below the holding unit constituted by the secondary upper holding piece 22 and the secondary lower holding piece 23, a contact face 25a with which the end face 17a of the primary frame member 10 comes into contact. Furthermore, the secondary inner wall middle recessed portion 28 is formed to be recessed from the contact face 25a and to be spaced apart from the end face 17a of the primary frame member 10. The secondary inner wall middle recessed portion 28 is provided so as to include a position that a substantially vertical central portion of the end face 17a of the primary frame member 10 faces.

A gap 33 is formed between the secondary inner wall middle recessed portion 28 and the end face 17a of the primary frame member 10 as shown in FIG. 6 for example, and the primary interior space 17 is in communication with the exterior via the gap.

In the solar cell module 1 described above, as shown in FIGS. 3 and 10 for example, in the secondary inner wall middle recessed portion 28 of the secondary frame member 20a, a secondary inner wall recessed portion through hole 29 passing through the secondary inner wall middle recessed portion 28 is formed in a portion including a portion facing the end face 17a of the primary frame member 10. The secondary interior space 27 of the secondary frame member 20a is in communication with the exterior via the secondary inner wall recessed portion through hole 29.

As shown in FIG. 9, a secondary bottom piece through hole 31 passing through the secondary bottom piece 24 is formed in the secondary bottom piece 24 (bottom portion) of the secondary frame member 20a. The secondary interior space 27 of the secondary frame member 20a is in communication with the exterior via the secondary bottom piece through hole 31.

As described above, with the solar cell module 1, in the secondary inner wall 25 of the secondary frame member 20a, which includes a portion that is in contact with the end face 17a of the primary frame member 10, the secondary inner wall middle recessed portion 28 where part of the secondary inner wall 25 is recessed toward the secondary interior space 27 is provided across the secondary inner wall 25 along the longitudinal direction of the secondary inner wall 25 at a position above the extension position of the secondary base piece 26. Also, the gap 33 is formed between the secondary inner wall middle recessed portion 28 and the end face 17a of the primary frame member 10, and thus the primary interior space 17 is in communication with the exterior via the gap 33.

Accordingly, the solar cell module 1 described above acts as follows when installed, for example, with one of the pair of secondary frame members 20a being positioned above the other, in an inclined location such as a roof.

That is to say, even if rain water or the like flows into the primary interior space 17 of the primary frame member 10 disposed at an incline, the primary interior space 17 is in communication with the exterior via the gap 33 formed between the secondary inner wall middle recessed portion 28 formed in the secondary frame member 20a and the end face 17a of the primary frame member 10 as described above, and it is therefore possible to discharge the rain water or the like that has flowed into the primary interior space 17 of the primary frame member 10 to the exterior via the gap 33. In addition, in case rain water that has flowed into the primary interior space 17 freezes, excess rain water is discharged before it freezes, and therefore freezing that would cause blockage of the opening portion of the primary interior space 17 will not occur. Accordingly, it is possible to prevent the frame shape from deformation.

In the solar cell module 1 described above, the secondary inner wall recessed portion through hole 29 passing through the secondary inner wall middle recessed portion 28 is formed in the secondary inner wall middle recessed portion 28, and the primary interior space 17 and the secondary interior space 27 are in communication with each other via the secondary inner wall recessed portion through hole 29. In addition, the secondary bottom piece through hole 31 passing through the secondary bottom piece 24 is formed in the secondary bottom piece 24 of the secondary frame member 20a, and thus the secondary interior space 27 is in communication with the exterior via the secondary bottom piece through hole 31.

Accordingly, even if rain water or the like flows into the solar cell module 1 and into the secondary interior space 27 of the secondary frame member 20a of the solar cell module 1, the rain water or the like that has flowed thereinto can be discharged to the external environment via the secondary bottom piece through hole 31 formed in the secondary bottom piece 24 of the secondary frame member 20a.

Also, as described above, when rain water or the like flows into the primary interior space 17 of the primary frame member 10, it is possible to cause the rain water or the like flowing in the primary interior space 17 to flow into the secondary interior space 27 of the secondary frame member 20a through the secondary inner wall recessed portion through hole 29, and also possible to cause the rain water or the like that has flowed into the secondary interior space 27 to be discharged to the external environment through the secondary bottom piece through hole 31 formed in the secondary bottom piece 24 of the secondary frame member 20*a*.

Accordingly, even if the solar cell module 1 described above is installed outdoor such as on the roof, and rain water or the like flows into the solar cell module 1, the rain water or the like that has flowed into the solar cell module 1 can be discharged. In addition, in case rain water that has flowed into the solar cell module 1 freezes, excess rain water is discharged before it freezes, and therefore freezing that would cause blockage of the opening portion of the primary interior space 17 will not occur. Accordingly, it is possible to prevent the frame shape from deformation.

Also, because the primary interior space 17 and the secondary interior space 27 are in communication with each other, rain water that has flowed into both the primary interior space 17 and the secondary interior space 27 can be effectively discharged to the external environment through the secondary bottom piece through hole 31. The same effects can be obtained if one of the pair of primary frame members 10 is disposed to be positioned above the other, and in this case, the degree of freedom of construction of the solar cell module 1 can be enhanced.

As an example using extrusion molding or the like as a method for molding a frame member, in the solar cell module 1 described above, in the secondary frame member 20*a*, the secondary inner wall middle recessed portion 28 where part of the secondary inner wall 25 is recessed toward the secondary interior space 27 is formed across the secondary inner wall 25 along the longitudinal direction of the secondary inner wall 25 at a position above the extension position of the secondary base piece 26. However, for example, the secondary inner wall middle recessed portion 28 may be formed only in an end portion of the secondary inner wall 25 along the longitudinal direction of the secondary inner wall 25.

Specifically, the secondary inner wall middle recessed portion 28 where part of the secondary inner wall 25 is recessed toward the secondary interior space 27 is formed at an end portion of the secondary inner wall 25 of the secondary frame member 20*a* that includes a portion that is in contact with the end face 17*a* of the primary frame member 10. With this configuration as well, a gap 33 is formed between the secondary inner wall middle recessed portion 28 and the end face 17*a* of the primary frame member 10, and the primary interior space 17 can be brought into communication with the exterior via the gap 33.

In the solar cell module 1 described above, the secondary inner wall recessed portion through hole 29 and the secondary bottom piece through hole 31 are formed in the secondary frame member 20*a* of the solar cell module 1. However, it is also possible to omit formation of the secondary inner wall recessed portion through hole 29 and the secondary bottom piece through hole 31 in the secondary frame member 20*a* of the solar cell module 1.

In this case as well, in the solar cell module 1, because the primary interior space 17 is in communication with the exterior via the gap 33 formed between the secondary inner wall middle recessed portion 28 formed in the secondary frame member 20*a* and the end face 17*a* of the primary frame member 10, as described above, rain water or the like that has flowed into the primary interior space 17 of the primary frame member 10 disposed at an incline can be discharged to the exterior via the gap 33.

In the solar cell module 1 described above, the flat primary outer wall end portion 18 is formed at an end portion of the primary outer wall 11 by removing the edge of the primary frame member 10 by the width of the secondary frame member 20*a*, and an end face at an end portion of the secondary frame member 20*a* is brought into contact with the interior face of the primary outer wall end portion 18. However, the method of bonding the primary frame member 10 and an end portion of the secondary frame member 20*a* is not limited thereto, and rather than removing the edge of the primary frame member 10, it is also possible to, for example, provide a screw holder in the primary frame member 10 and a screw hole in the secondary frame member 20*a* so as to bond the primary frame member 10 and the secondary frame member 20*a*. It is also possible to bond the primary frame member 10 and the secondary frame member 20*a* by using an L-shaped angle bracket or the like.

Embodiment 2

Figure 11:
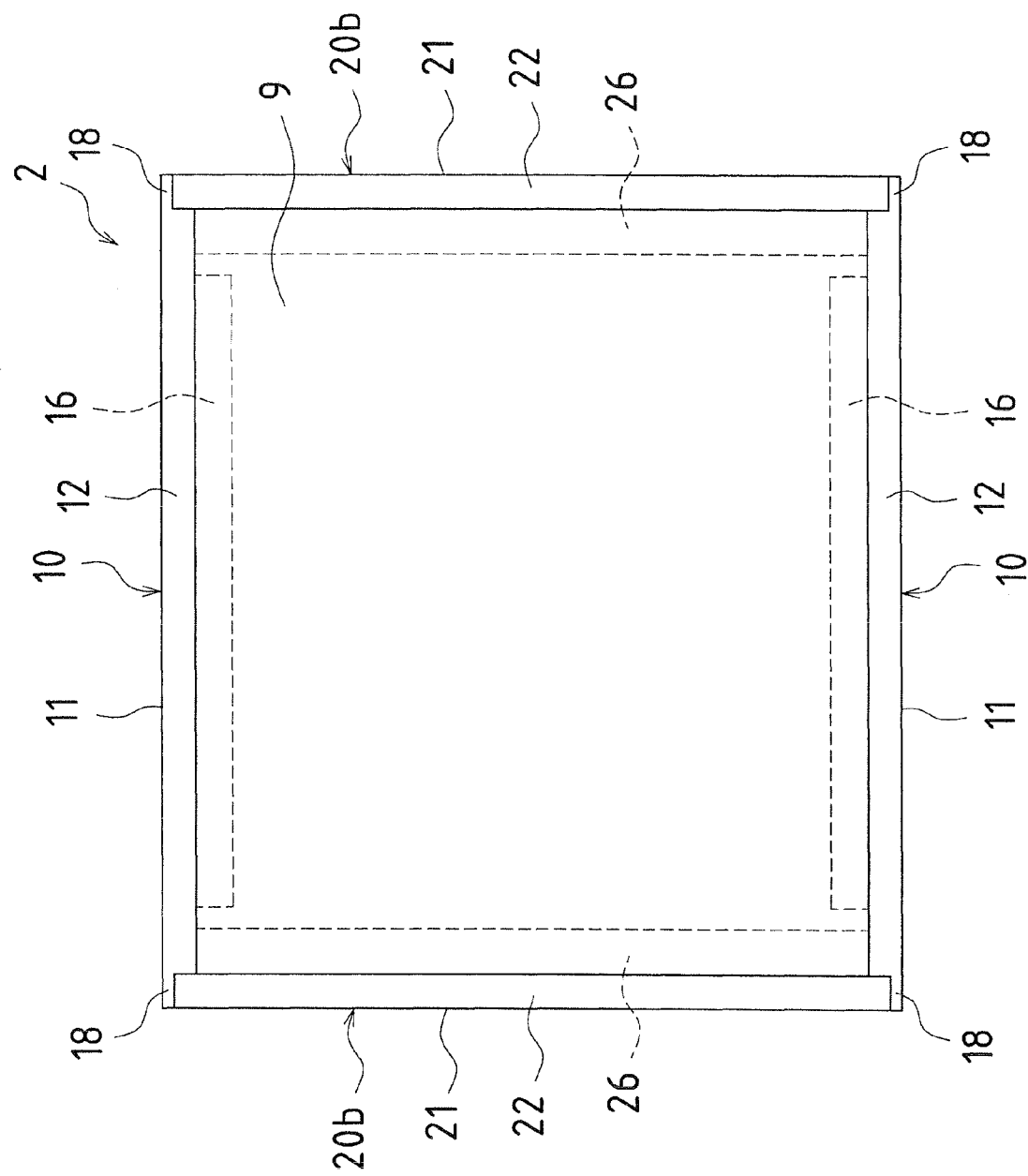
FIG. 11 is a plan view of a solar cell module according to Embodiment 2.

FIG. 11 is a plan view of a solar cell module 2 according to Embodiment 2. The solar cell module 2 according to Embodiment 2 is primarily made up of a pair of primary frame members 10 and a pair of secondary frame members 20*b*, which together constitute a frame member, and a solar cell panel 9.

Figure 12:
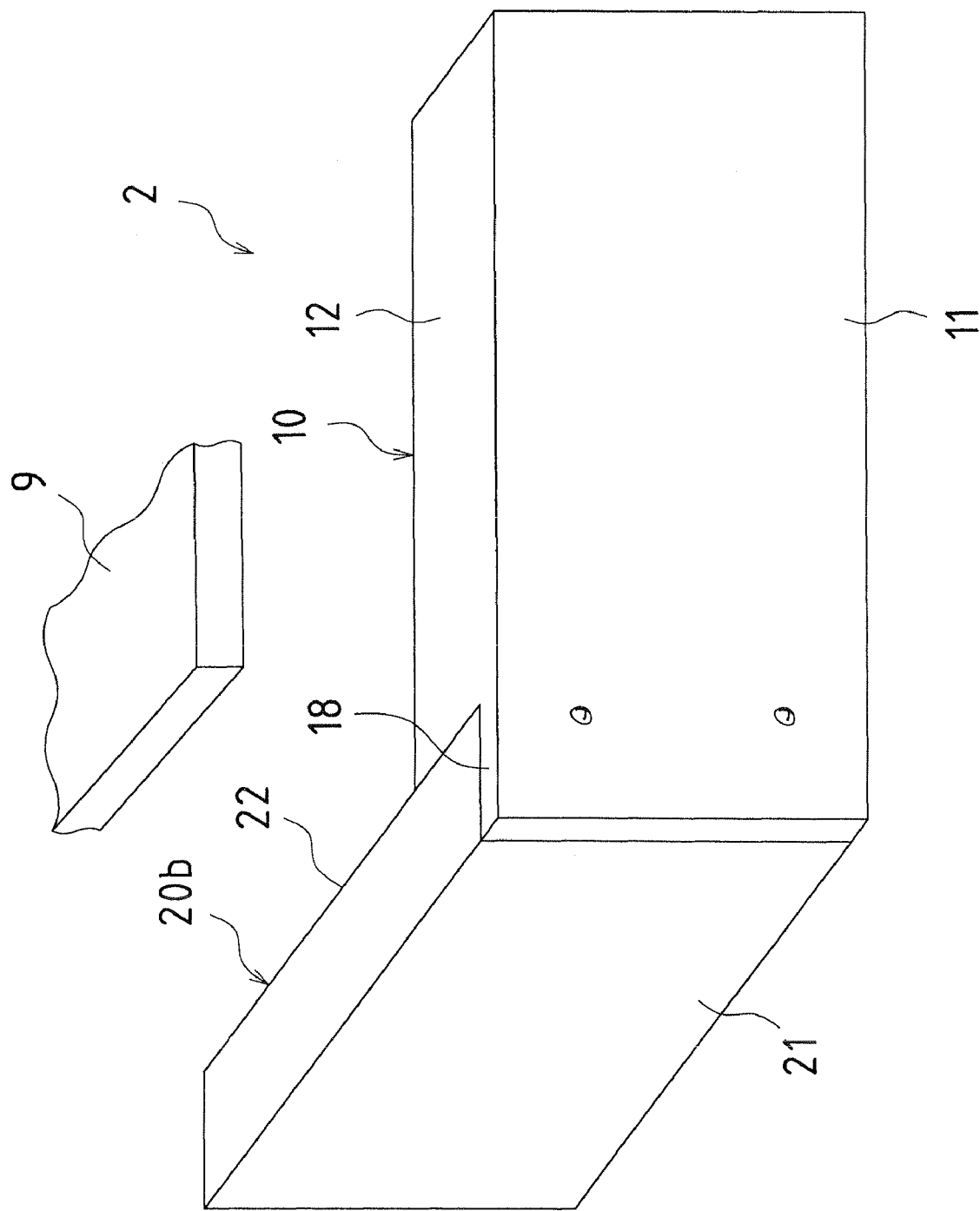
FIG. 12 is a partial perspective view of a frame member of the solar cell module according to Embodiment 2 as viewed from the outside.
Figure 13:
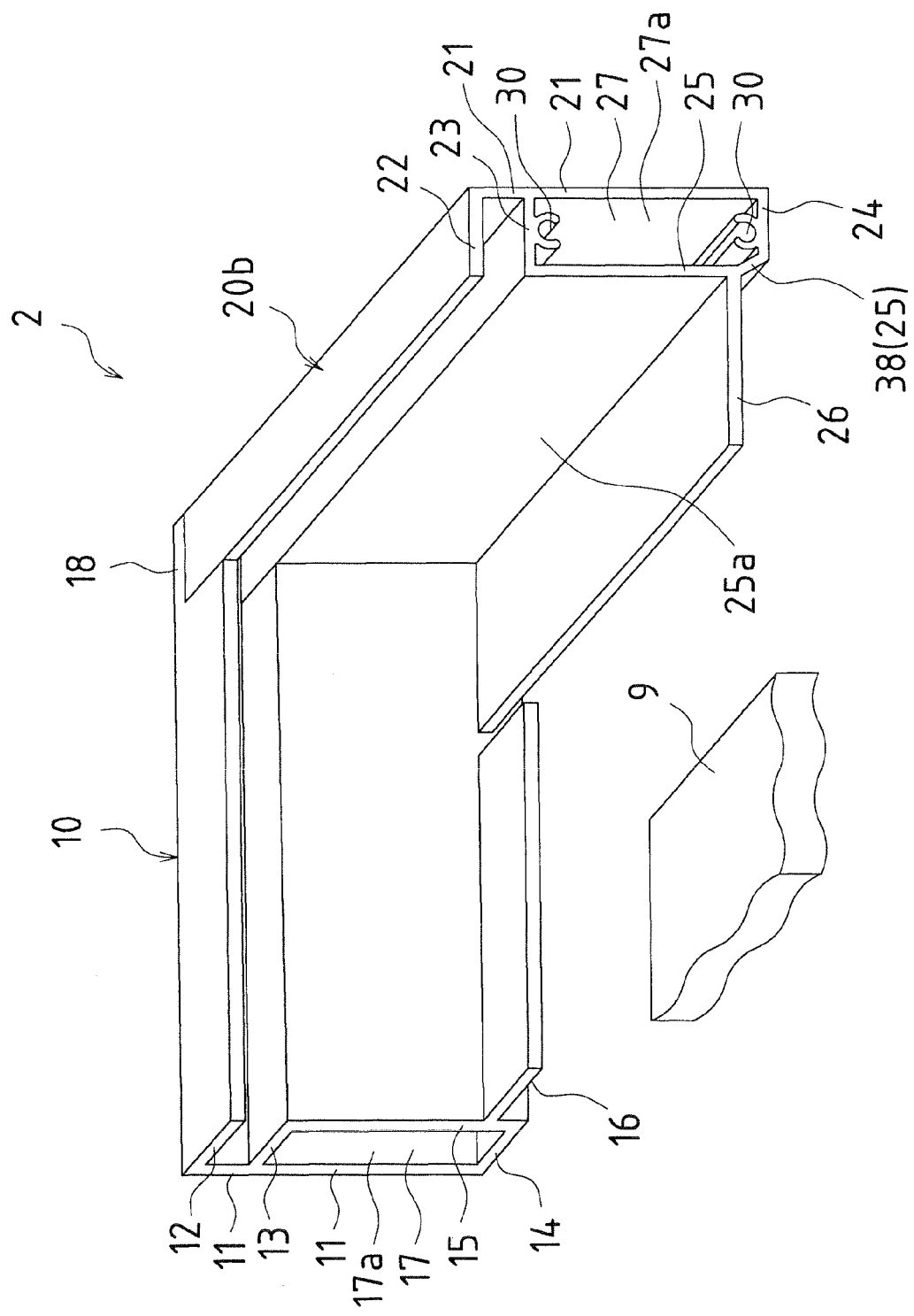
FIG. 13 is a partial perspective view of the frame member of the solar cell module according to Embodiment 2 as viewed from the inside.
Figure 14:
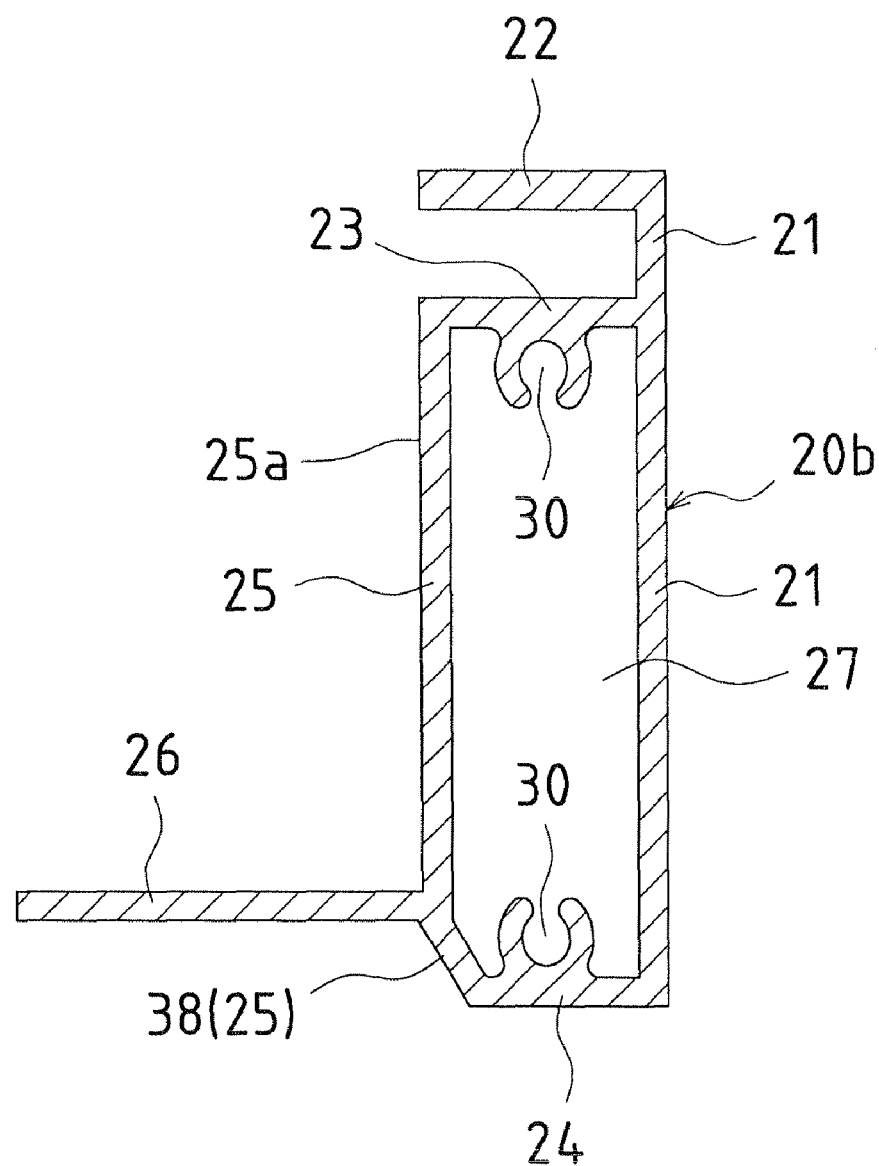
FIG. 14 is a cross-sectional view of a secondary frame member of the solar cell module according to Embodiment 2.
Figure 15:
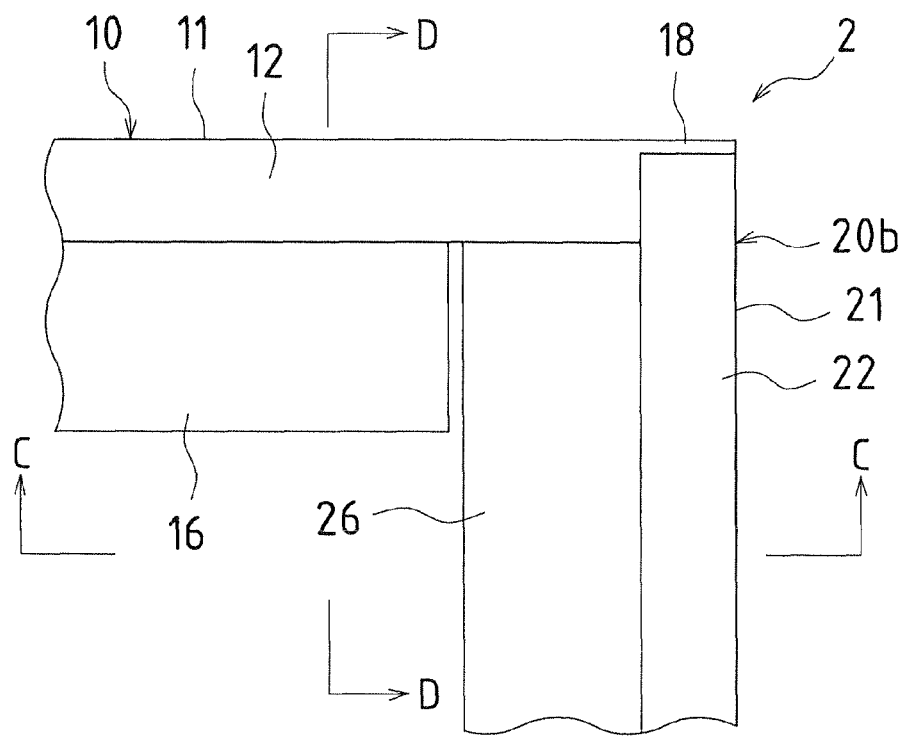
FIG. 15 is a partial plan view of the frame member of the solar cell module according to Embodiment 2.
Figure 16:
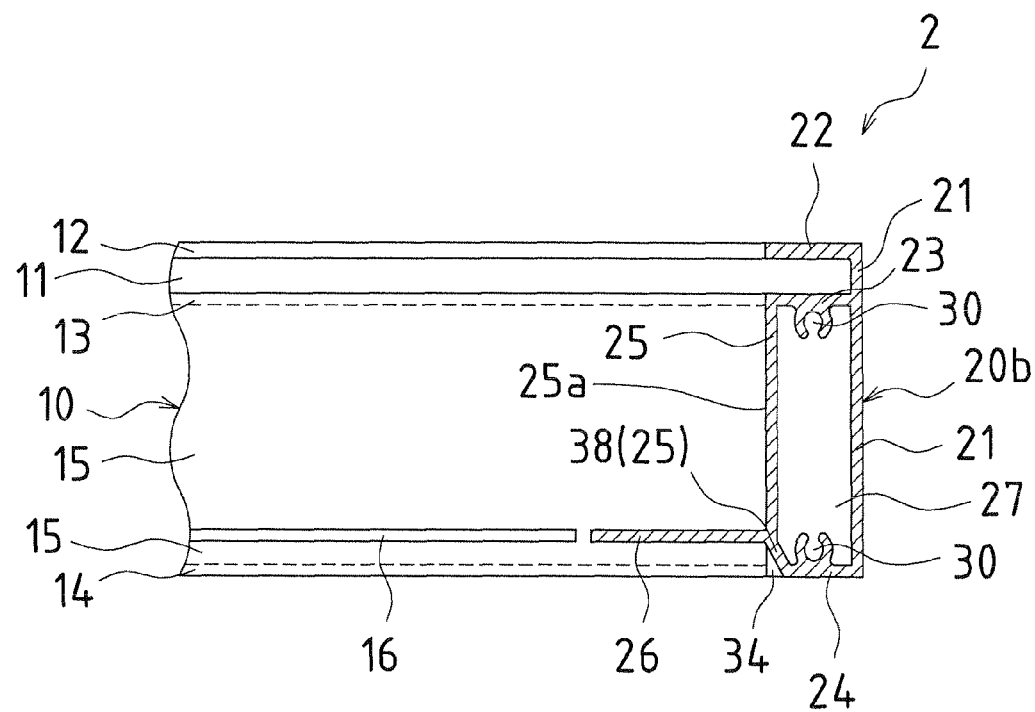
FIG. 16 is a side view including a cross section taken along the line C-C of FIG. 15.
Figure 17:
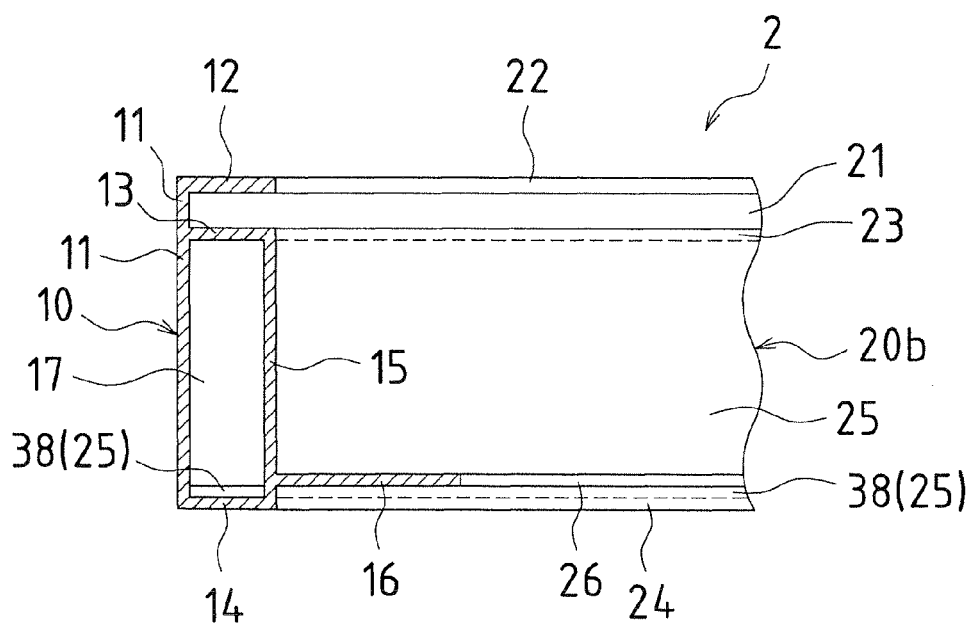
FIG. 17 is a side view including a cross section taken along the line D-D of FIG. 15.
Figure 18:
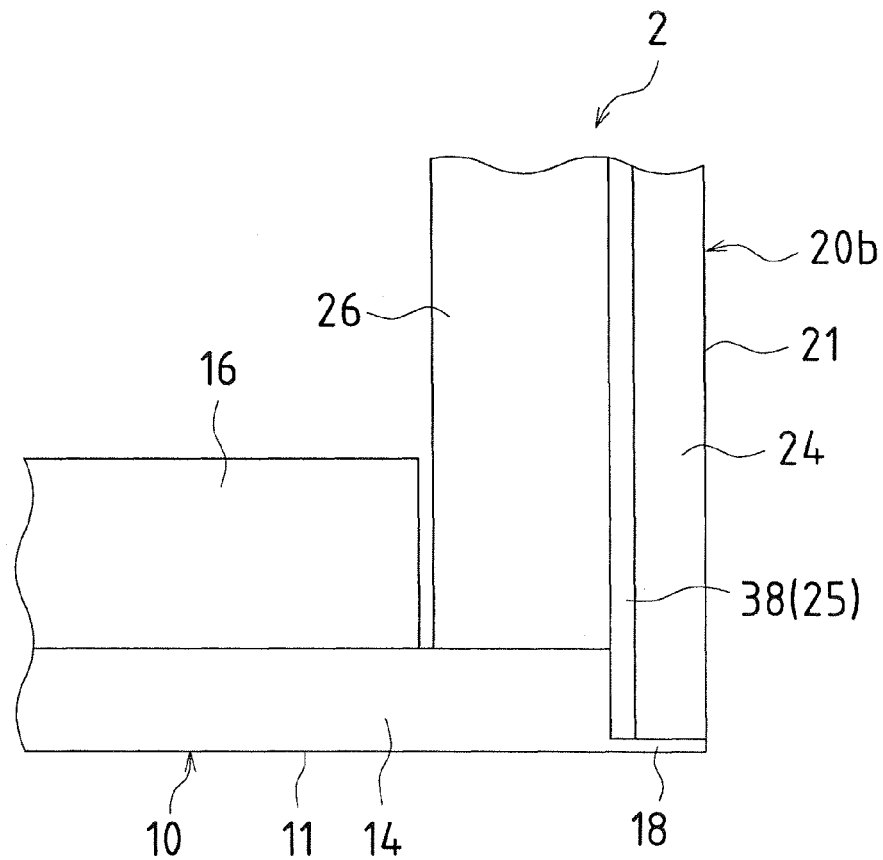
FIG. 18 is a partial bottom view of the frame member of the solar cell module according to Embodiment 2.
Figure 19:
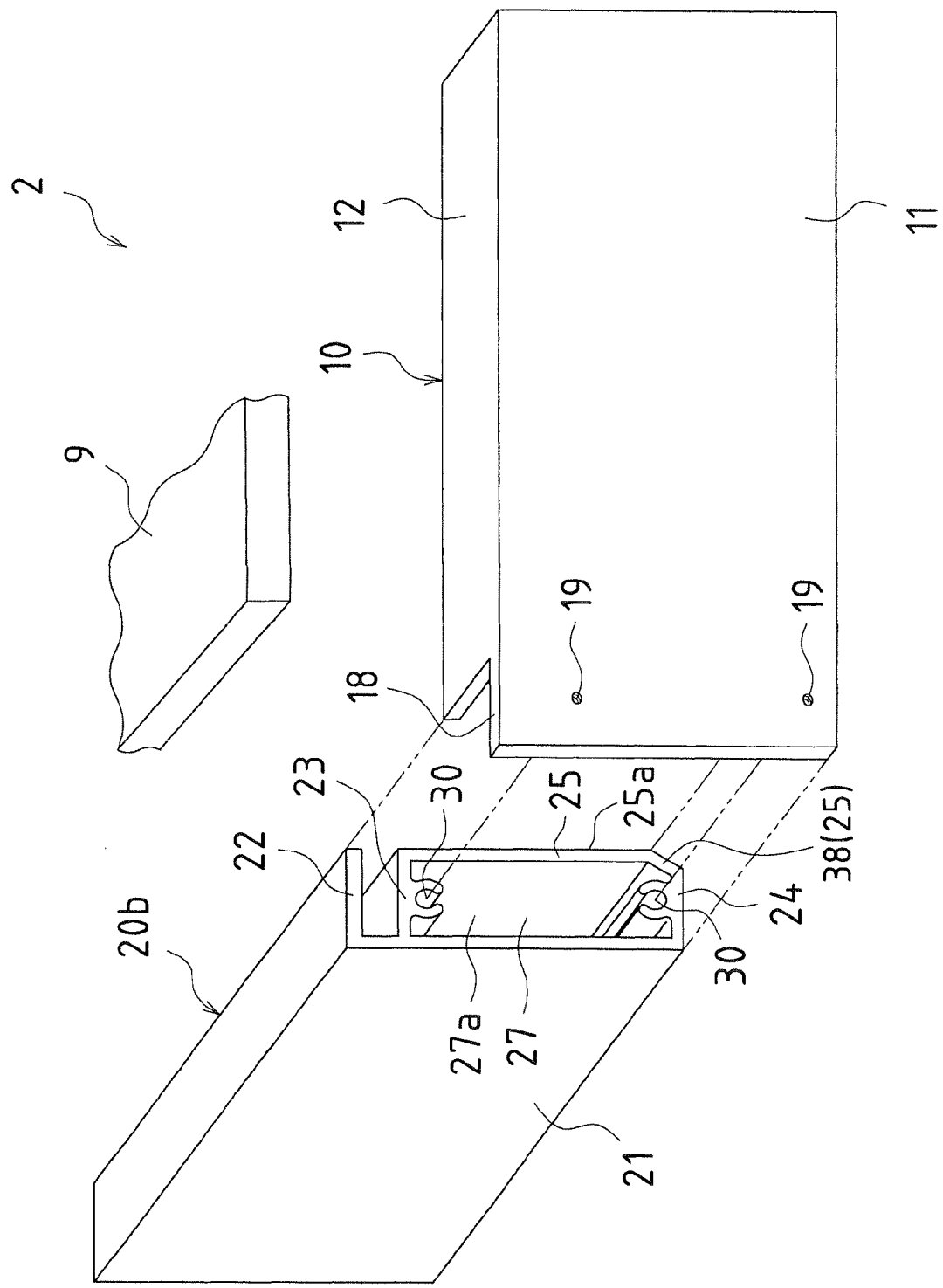
FIG. 19 is a partially exploded perspective view of the solar cell module according to Embodiment 2 as viewed from the outside.
Figure 20:
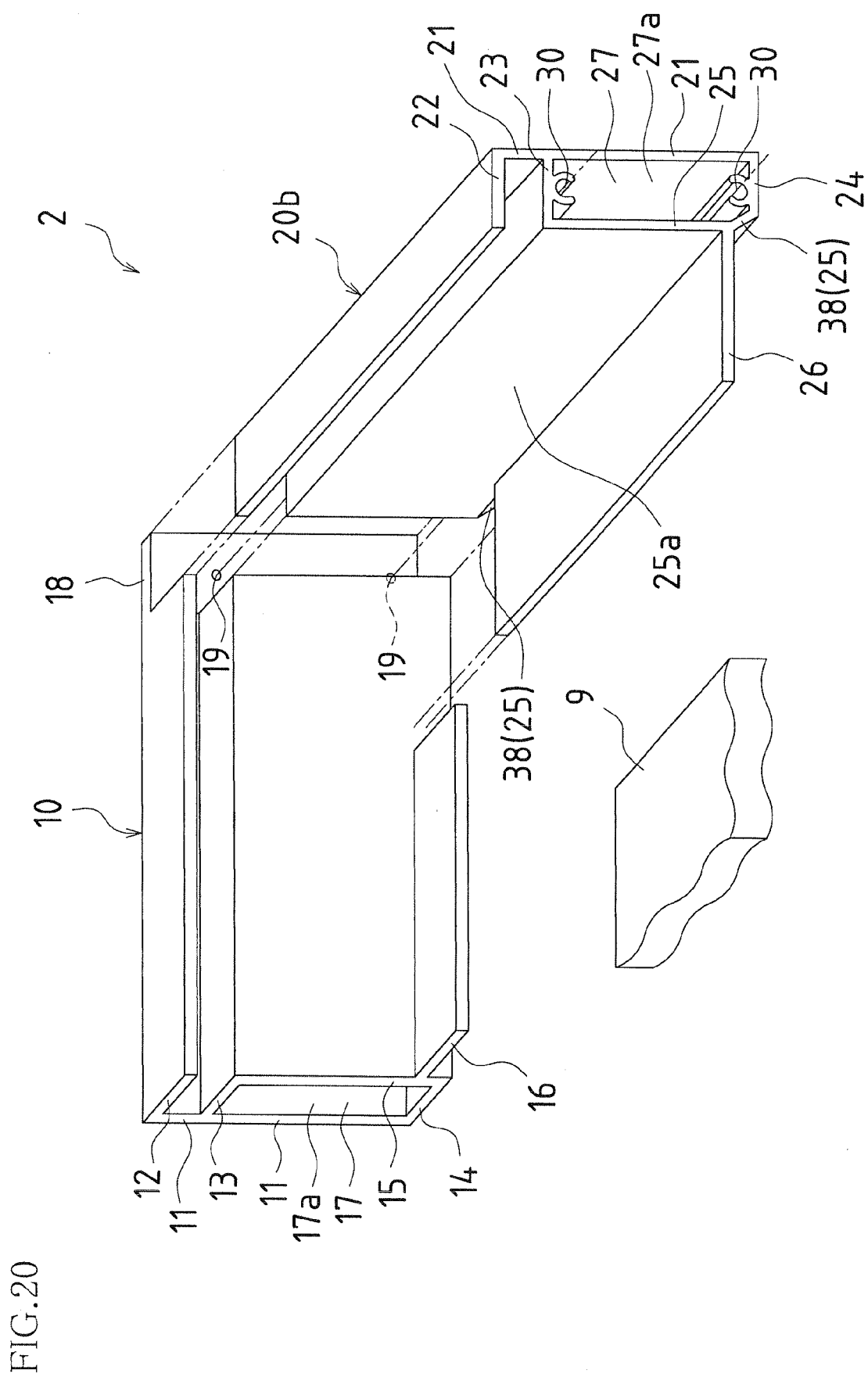
FIG. 20 is a partially exploded perspective view of the solar cell module according to Embodiment 2 as viewed from the inside.

FIG. 12 is a partial perspective view of the frame member of the solar cell module 2 according to Embodiment 2 as viewed from the outside. FIG. 13 is a partial perspective view of the frame member as viewed from the inside. FIG. 14 is a cross-sectional view of the secondary frame member 20*b*. FIG. 15 is a partial plan view of the frame member. FIG. 16 is a side view including a cross section taken along the line C-C of FIG. 15. FIG. 17 is a side view including a cross section taken along the line D-D of FIG. 15. FIG. 18 is a partial bottom view of the frame member. FIG. 19 is a partially exploded perspective view of the solar cell module 2 as viewed from the outside. FIG. 20 is a partially exploded perspective view of the solar cell module 2 as viewed from the inside.

The solar cell module 2 according to Embodiment 2 is substantially the same as the solar cell module 1 of Embodiment 1. The solar cell module 2 of Embodiment 2 is different from the solar cell module 1 of Embodiment 1 in that, in the solar cell module 2 according to Embodiment 2, a secondary inner wall lower end recessed portion 38 is formed instead of the secondary inner wall middle recessed portion 28 formed in the solar cell module 1 of Embodiment 1. The secondary inner wall lower end recessed portion 38 corresponds to the recessed portion described above.

Specifically, in the solar cell module 1 of Embodiment 1, as shown in FIGS. 3, 9 and 10 for example, in the secondary inner wall 25 of the secondary frame member 20*a*, which includes a portion that is in contact with the end face 17*a* of the primary frame member 10, the secondary inner wall middle recessed portion 28 where part of the secondary inner wall 25 is recessed toward the secondary interior space 27 is formed across the secondary inner wall 25 along the longitudinal direction of the secondary inner wall 25 at a position above the extension position of the secondary base piece 26.

In contrast, in the solar cell module 2 according to Embodiment 2, as shown in FIGS. 13, 19 and 20 for example, in the secondary inner wall 25 of the secondary frame member 20*b*, which includes a portion that is in contact with the end face 17*a* of the primary frame member 10, the secondary inner wall lower end recessed portion 38 is formed across the secondary inner wall 25 along the longitudinal direction of the secondary inner wall 25 at a lower end of the secondary inner wall 25 positioned below the extension position of the secondary base piece 26. In other words, the secondary inner wall lower end recessed portion 38 is provided below the lower end of the contact face 25a. As shown in FIGS. 13, 19 and 20 for example, the secondary inner wall lower end recessed portion 38 is formed by obliquely chamfering a corner formed by the secondary inner wall 25 and the secondary bottom piece 24 of the secondary frame member 20b. To rephrase, the secondary inner wall lower end recessed portion 38 is formed so as to be chamfered from the lower end of the contact face 25a obliquely downward.

In the solar cell module 2 of Embodiment 2, a gap 34 having a triangular cross section is formed between the secondary inner wall lower end recessed portion 38 of the secondary frame member 20b formed by obliquely chamfering the corner formed by the secondary inner wall 25 and the secondary bottom piece 24 of the secondary frame member 20b and the end face 17a of the primary frame member 10. The primary interior space 17 is therefore in communication with the exterior via the gap 34.

With the solar cell module 2 of Embodiment 2, the gap 34 having a triangular cross section is formed between the secondary inner wall lower end recessed portion 38 of the secondary inner wall 25 formed in the secondary frame member 20b and the end face 17a of the primary frame member 10. The primary interior space 17 is therefore in communication with the exterior via the gap 34.

It is therefore possible to discharge rain water or the like that has flowed into the primary interior space 17 of the primary frame member 10 to the exterior via the gap 34. Accordingly, even when the solar cell module 2 described above is installed outdoor such as on the roof, and rain water or the like flows into the solar cell module 2, the rain water or the like that has flowed into the solar cell module 2 can be discharged.

Note that in the solar cell module 2 of Embodiment 2, the secondary inner wall recessed portion through hole 29 and the secondary bottom piece through hole 31 formed in the secondary frame member 20a of the solar cell module 1 of Embodiment 1 are not formed. However, as in the solar cell module 1 of Embodiment 1, it is also possible to form the secondary inner wall recessed portion through hole 29 and the secondary bottom piece through hole 31 in the solar cell module 2 of Embodiment 2.

The same action and effects as those of the solar cell module 1 of Embodiment 1 can also be obtained in the solar cell module 2 of Embodiment 2 by forming the secondary inner wall recessed portion through hole 29 and the secondary bottom piece through hole 31 in the secondary frame member 20b of the solar cell module 2 of Embodiment 2.

Embodiment 3

Figure 21:
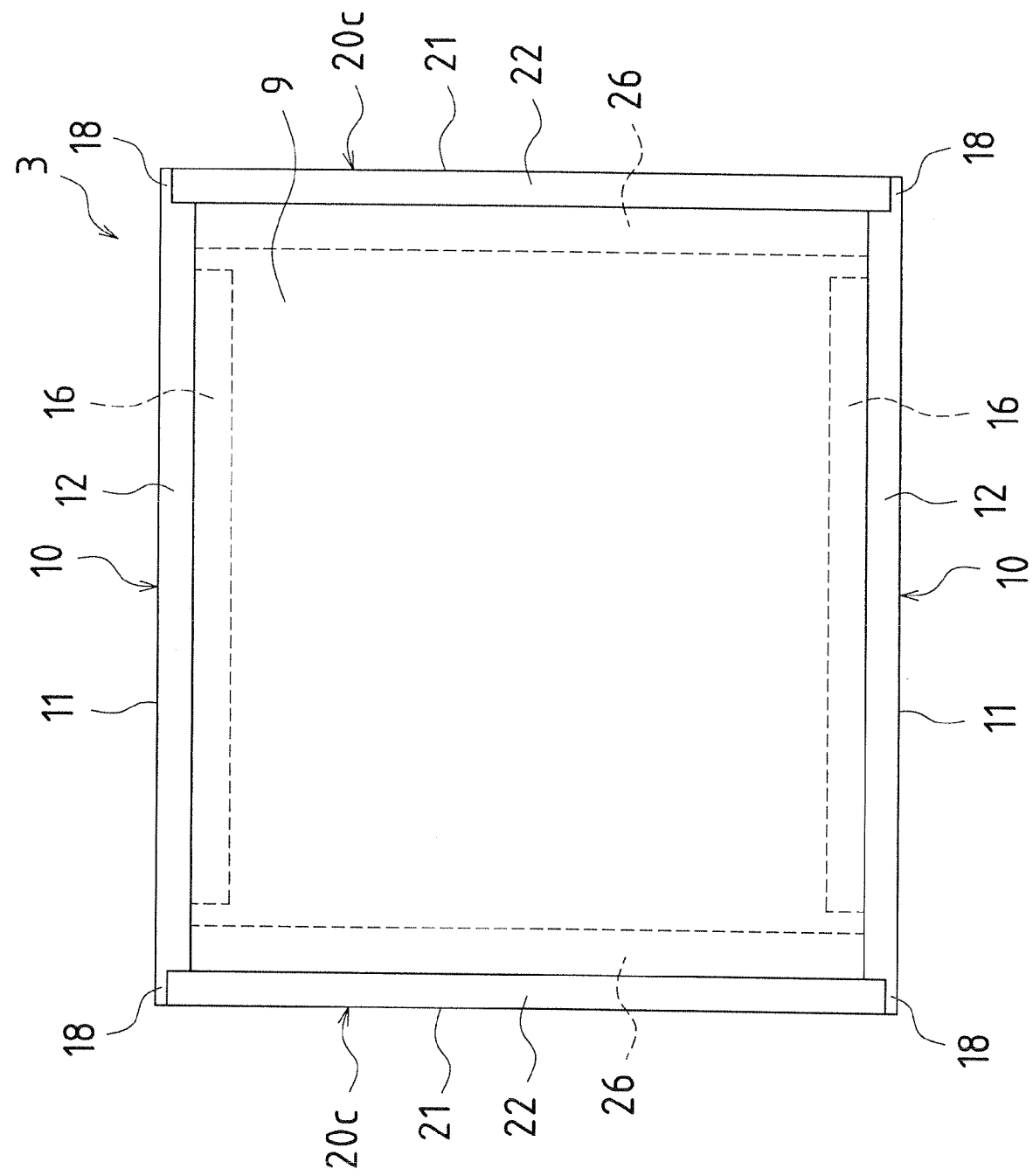
FIG. 21 is a plan view of a solar cell module according to Embodiment 3.

FIG. 21 is a plan view of a solar cell module 3 according to Embodiment 3. The solar cell module 3 according to Embodiment 3 is primarily made up of a pair of primary frame members 10 and a pair of secondary frame members 20c, which together constitute a frame member, and a solar cell panel 9.

Figure 22:
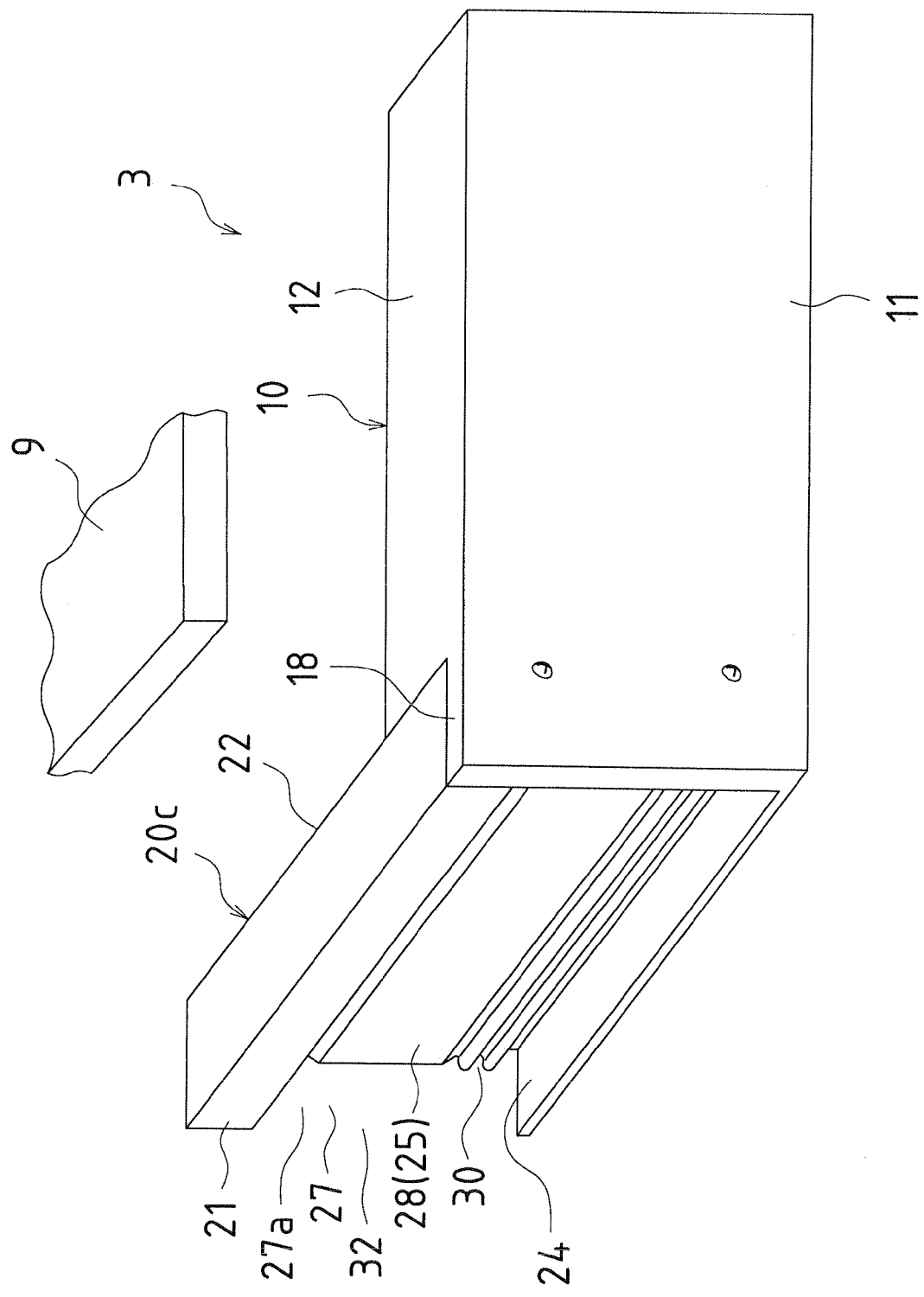
FIG. 22 is a partial perspective view of a frame member of the solar cell module according to Embodiment 3 as viewed from the outside.
Figure 23:
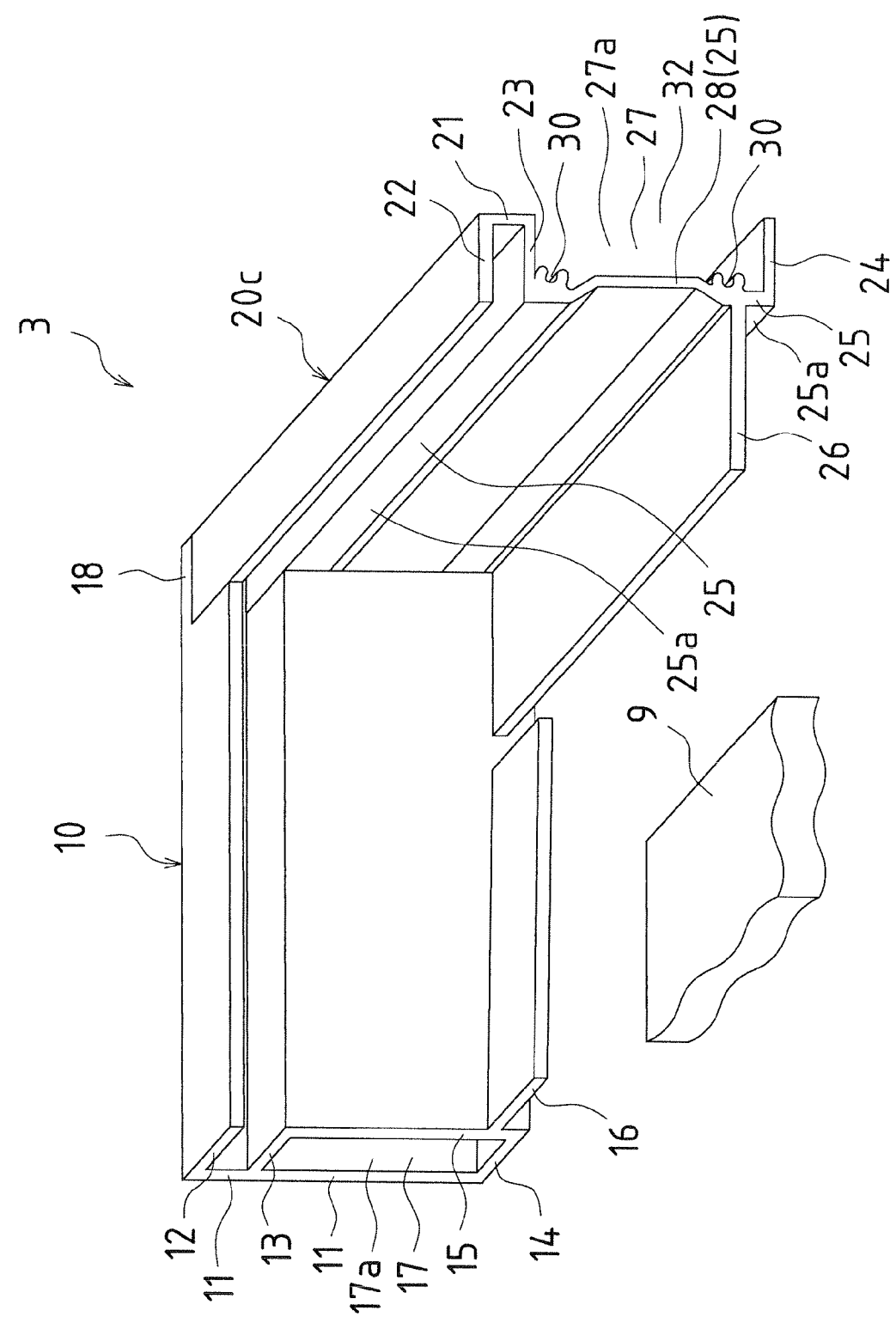
FIG. 23 is a partial perspective view of the frame member of the solar cell module according to Embodiment 3 as viewed from the inside.
Figure 24:
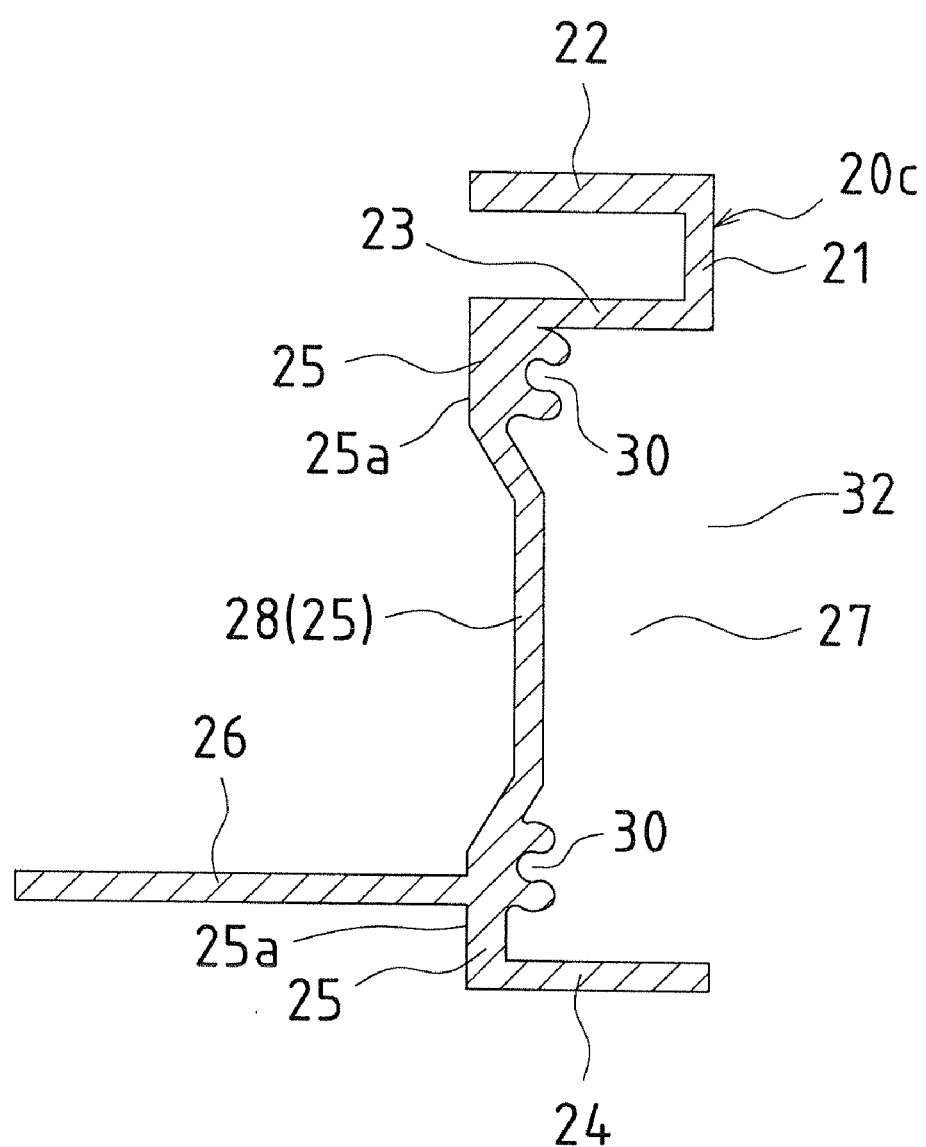
FIG. 24 is a cross-sectional view of a secondary frame member of the solar cell module according to Embodiment 3.
Figure 25:
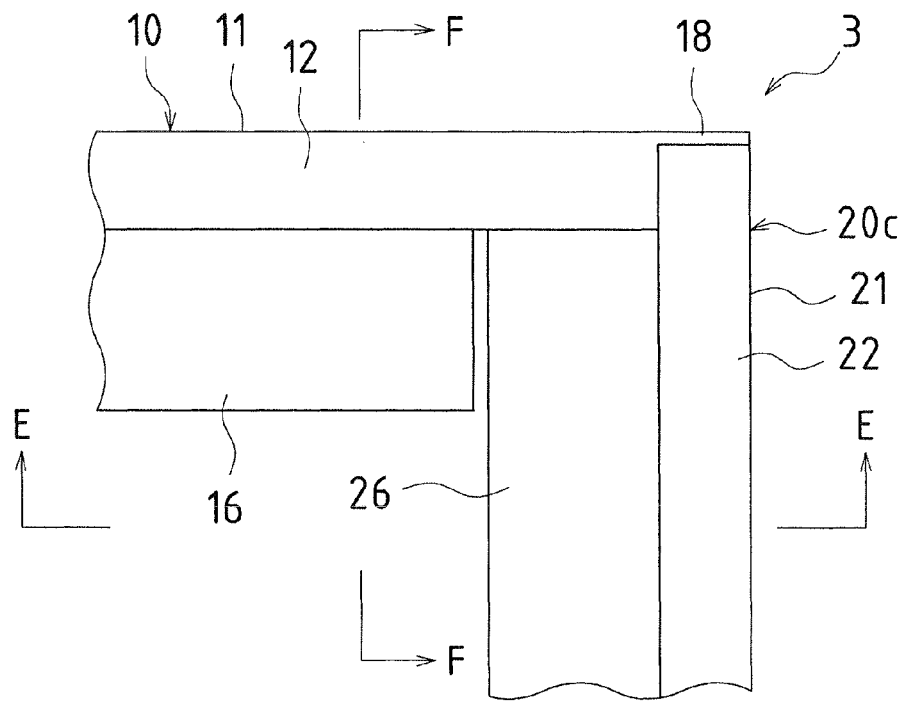
FIG. 25 is a partial plan view of the frame member of the solar cell module according to Embodiment 3.
Figure 26:
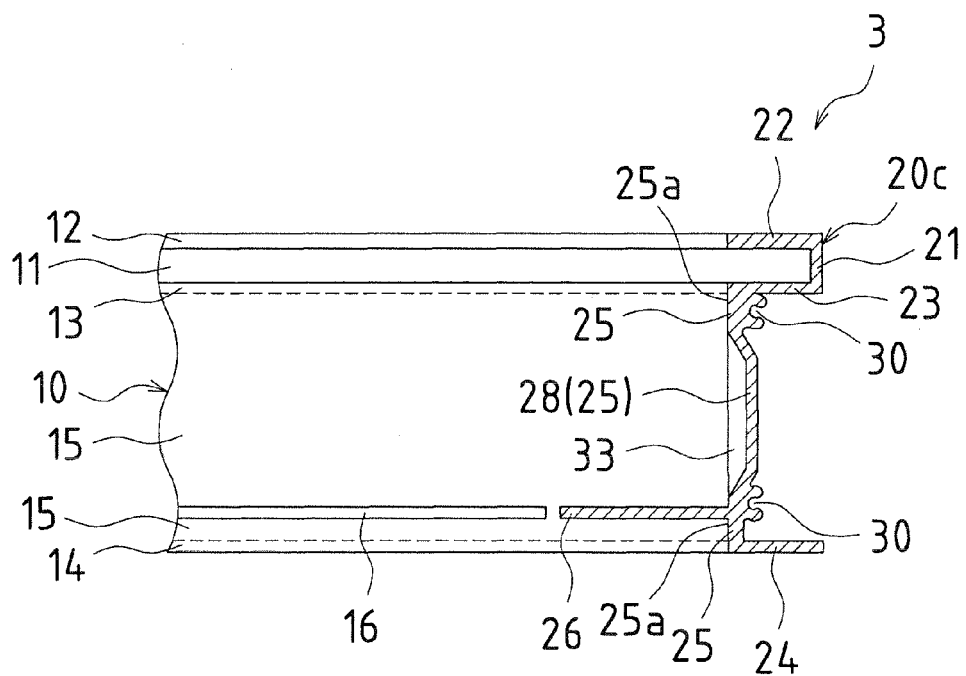
FIG. 26 is a side view including a cross section taken along the line E-E of FIG. 25.
Figure 27:
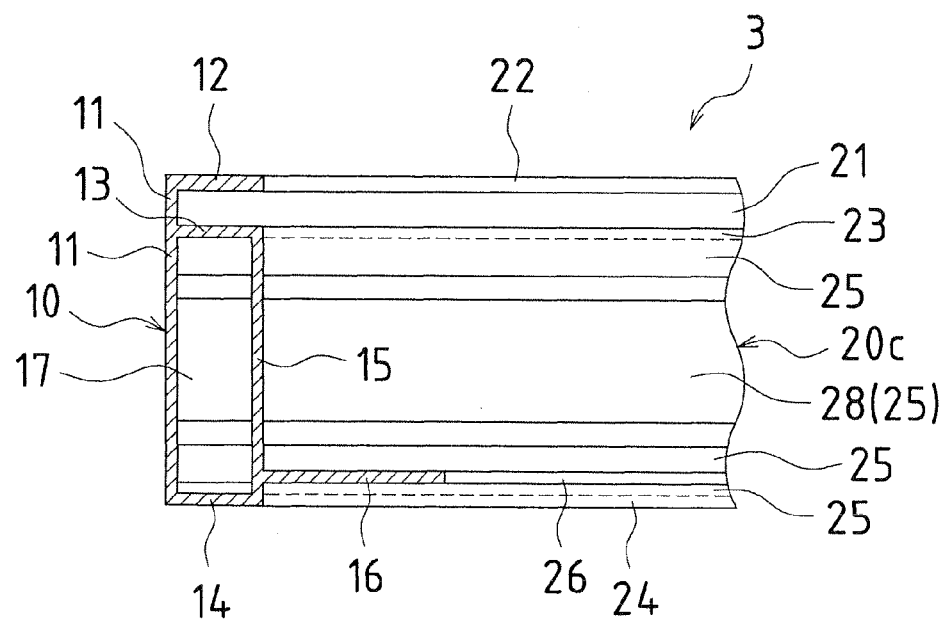
FIG. 27 is a side view including a cross section taken along the line F-F of FIG. 25.
Figure 28:
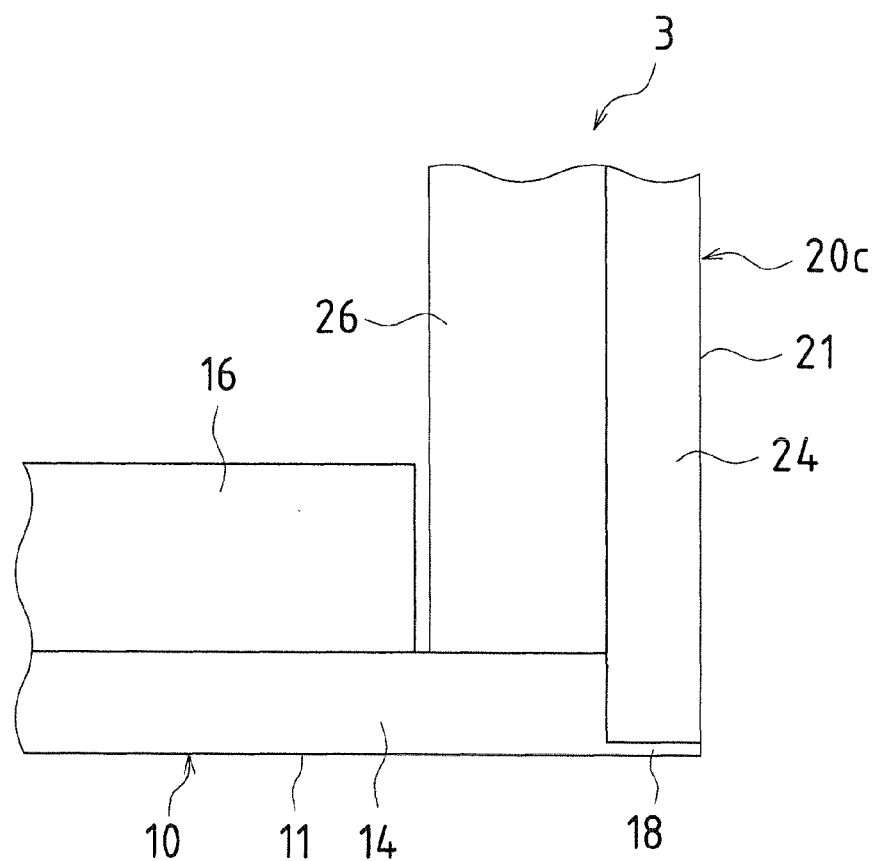
FIG. 28 is a partial bottom view of the frame member of the solar cell module according to Embodiment 3.
Figure 29:
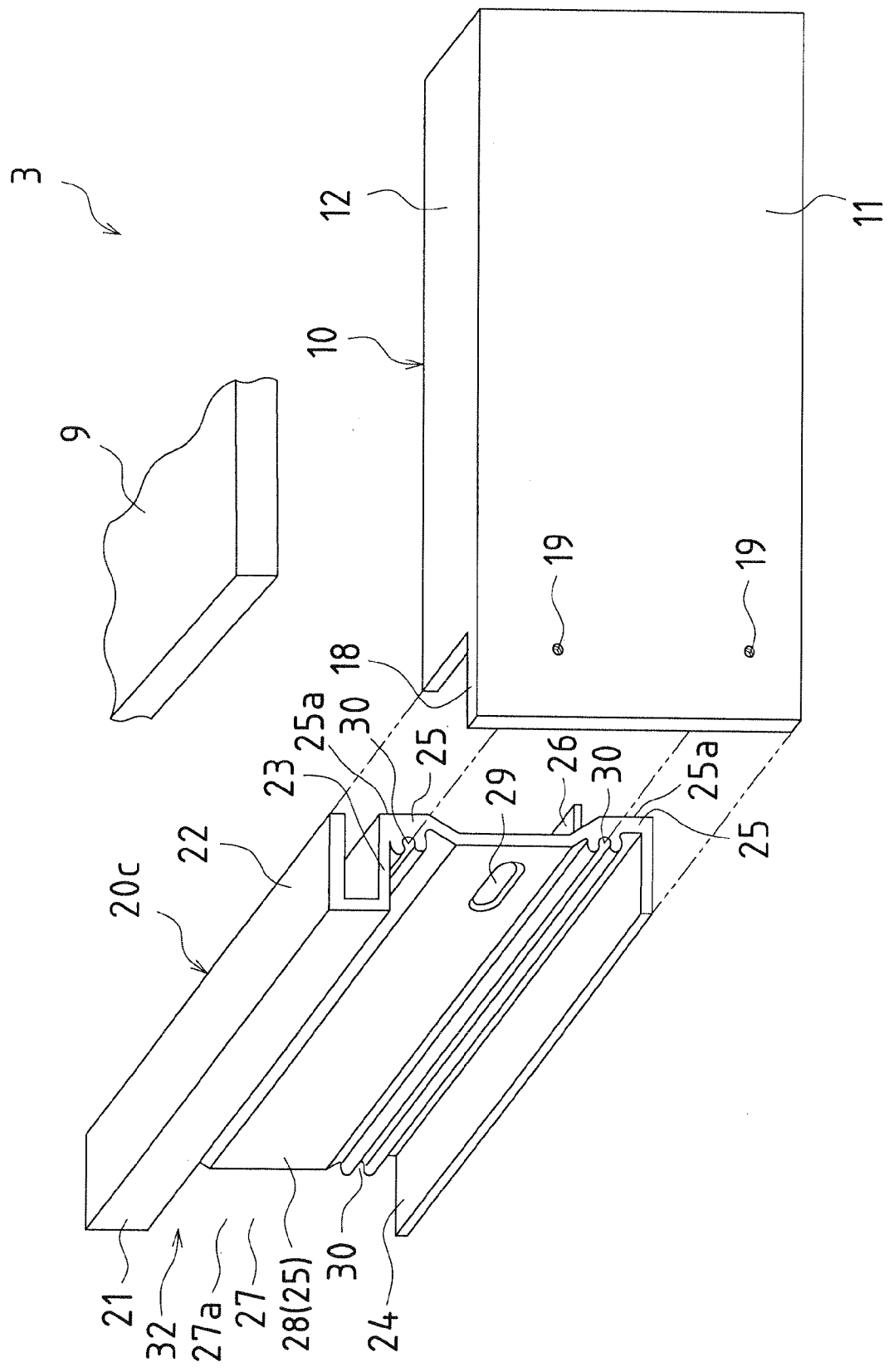
FIG. 29 is a partially exploded perspective view of the solar cell module according to Embodiment 3 as viewed from the outside.
Figure 30:
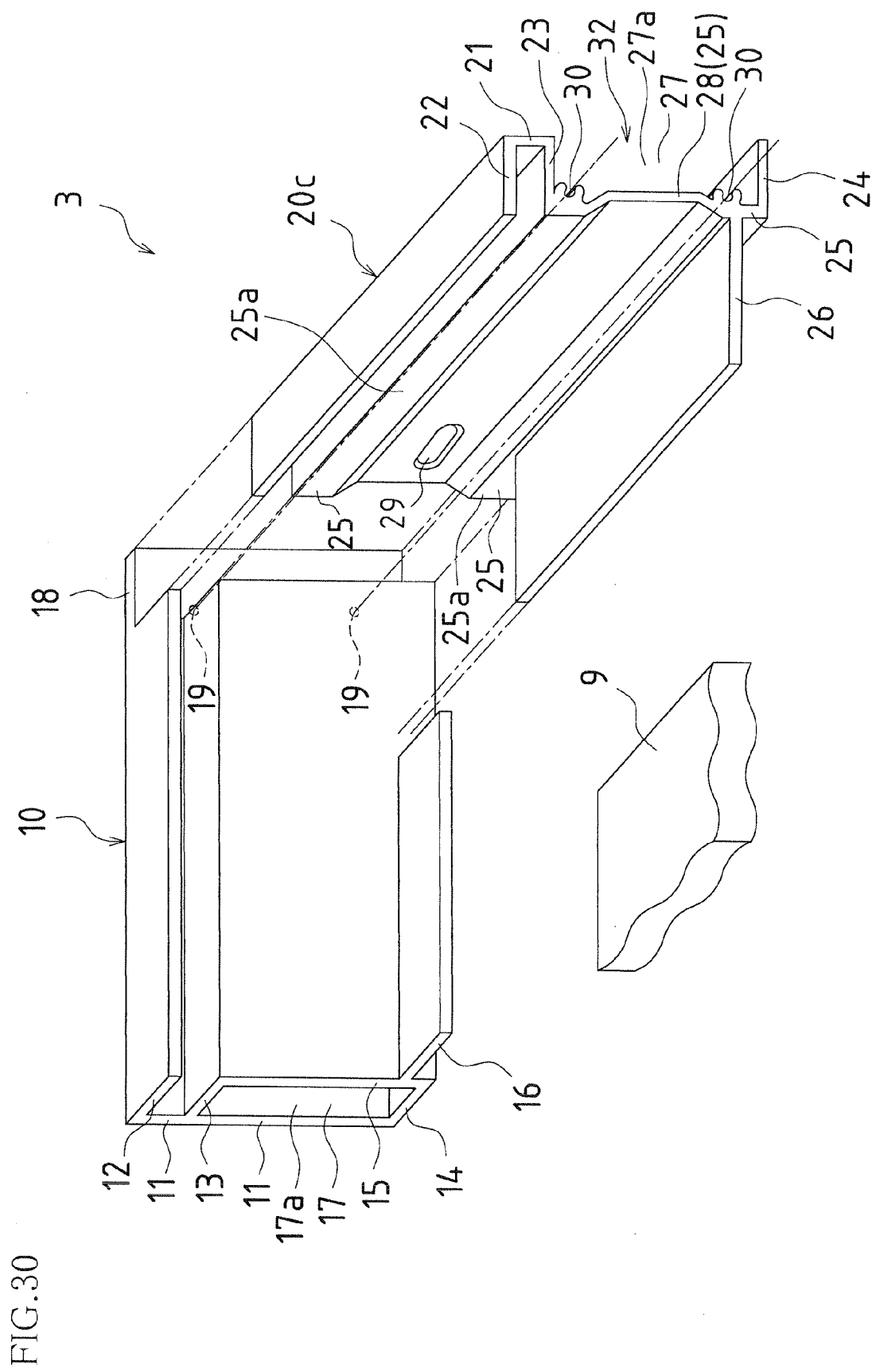
FIG. 30 is a partially exploded perspective view of the solar cell module according to Embodiment 3 as viewed from the inside.

FIG. 22 is a partial perspective view of the frame member of the solar cell module 3 according to Embodiment 3 as viewed from the outside. FIG. 23 is a partial perspective view of the frame member as viewed from the inside. FIG. 24 is a cross-sectional view of the secondary frame member 20c. FIG. 25 is a partial plan view of the frame member. FIG. 26 is a side view including a cross section taken along the line E-E of FIG. 25. FIG. 27 is a side view including a cross section taken along the line F-F of FIG. 25. FIG. 28 is a partial bottom view of the frame member. FIG. 29 is a partially exploded perspective view of the solar cell module 3 as viewed from the outside. FIG. 30 is a partially exploded perspective view of the solar cell module 3 as viewed from the inside.

The solar cell module 3 according to Embodiment 3 is substantially the same as the solar cell module 1 of Embodiment 1. The solar cell module 3 of Embodiment 3 is different from the solar cell module 1 of Embodiment 1 in that, in the solar cell module 1 of Embodiment 1, the secondary outer wall 21 of the secondary frame member 20a does not include an opening portion, whereas in the solar cell module 3 of Embodiment 3, a secondary outer wall opening portion 32 serving as an opening portion is provided in the secondary outer wall 21 of the secondary frame member 20c.

In other words, in the solar cell module 1 of Embodiment 1, as shown in FIGS. 3 and 4 for example, the secondary frame member 20a is made up of the secondary outer wall 21, the secondary upper holding piece 22, the secondary lower holding piece 23, the secondary bottom piece 24, the secondary inner wall 25 and the secondary base piece 26, and the secondary interior space 27 surrounded by the secondary outer wall 21, the secondary lower holding piece 23, the secondary inner wall 25 and the secondary bottom piece 24 is formed in the secondary frame member 20a as shown in FIG. 3 for example. In the solar cell module 1 of Embodiment 1, the secondary outer wall 21 of the secondary frame member 20a does not include an opening portion.

In contrast, in the solar cell module 3 of Embodiment 3, in the secondary outer wall 21 of the secondary frame member 20a of the solar cell module 1 of Embodiment 1, a portion of the secondary outer wall 21 forming the secondary interior space 27 is removed, and thereby forming an opening portion in the secondary outer wall 21 of the secondary frame member 20c of the solar cell module 3. This opening portion is the secondary outer wall opening portion 32 shown in FIGS. 22, 23, 24, 29 and 30 for example. In short, in the solar cell module 3 of Embodiment 3, the contact member 20c is open toward the outside on a side opposite to the contact face 25a.

With the solar cell module 3 of Embodiment 3, due to the secondary outer wall opening portion 32, the secondary interior space 27 of the secondary frame member 20c is not a sealed space, but a space provided with the secondary outer wall opening portion 32, as a result of which rain water or the like that has flowed into the secondary interior space 27 of the secondary frame member 20c can be discharged through the secondary outer wall opening portion 32.

Also, when rain water or the like flows into the primary interior space 17 of the primary frame member 10, as in the case of the solar cell module 1 of Embodiment 1, it is possible to cause rain water or the like flowing in the primary interior space 17 to flow into the secondary interior space 27 of the secondary frame member 20c through the secondary inner wall recessed portion through hole 29, and also possible to cause the rain water or the like that has flowed into the secondary interior space 27 to be discharged through the secondary outer wall opening portion 32.

Accordingly, even if the solar cell module 3 described above is installed outdoor such as on the roof, and rain water or the like flows into the solar cell module 3, the rain water or the like can be discharged. Also, as in Embodiment 1, in case rain water that has flowed into the solar cell module 3 freezes, it is possible to prevent the frame shape from deformation.

The solar cell module 3 of Embodiment 3 is based on the solar cell module 1 of Embodiment 1, and thus the secondary inner wall middle recessed portion 28 is formed in the secondary inner wall 25 of the secondary frame member 20c of the solar cell module 3 of Embodiment 3.

However, the solar cell module 3 of Embodiment 3 may be constructed based on the solar cell module 2 of Embodiment 2. In this case, instead of the secondary inner wall middle recessed portion 28, the secondary inner wall lower end recessed portion 38 is formed in the secondary inner wall 25 of the secondary frame member 20c of the solar cell module 3 of Embodiment 3.

The present invention may be embodied in various other forms without departing from the gist or essential characteristics thereof. Therefore, the embodiments given above are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Japanese Patent Application No. 2008-158459 filed in Japan on Jun. 17, 2008, the entire content of which is incorporated herein by reference.

INDUSTRIAL APPLICABILITY

The present invention is applicable to solar cell modules installed in an outdoor installation location such as roofs so that sunlight can be used without waste.

DESCRIPTION OF REFERENCE NUMERALS

1 Solar Cell Module
2 Solar Cell Module
3 Solar Cell Module
9 Solar Cell Panel
10 Primary Frame Member
11 Primary Outer Wall
12 Primary Upper Holding Piece
13 Primary Lower Holding Piece
14 Primary Bottom Piece
15 Primary Inner Wall
16 Primary Base Piece
17 Primary Interior Space
17a End Face
18 Primary Outer Wall End Portion
19 Screw Hole
20a Secondary Frame Member
20b Secondary Frame Member
20c Secondary Frame Member
21 Secondary Outer Wall
22 Secondary Upper Holding Piece
23 Secondary Lower Holding Piece
24 Secondary Bottom Piece
25 Secondary Inner Wall
25a Contact Face
26 Secondary Base Piece
27 Secondary Interior Space
27a Opening Portion
28 Secondary Inner Wall Middle Recessed Portion
29 Secondary Inner Wall Recessed Portion Through Hole
30 Screw Holder
31 Secondary Bottom Piece Through Hole
32 Secondary Outer Wall Opening Portion
33 Gap
34 Gap
38 Secondary Inner Wall Lower End Recessed Portion

The invention claimed is:

1. A solar cell module comprising a solar cell panel having a primary side and a secondary side adjacent to the primary side, a primary frame member disposed along the primary side, and a secondary frame member disposed along the secondary side,
wherein the primary frame member and the secondary frame member include a holding unit that holds the solar cell panel, the primary frame member includes, below the holding unit of the primary frame member, an end face that is open at an end portion in a lengthwise direction of the primary frame member and a primary interior space communicating with the interior from the opening of the end face,
the secondary frame member includes, below the holding unit of the secondary frame member, a contact face with which the end face comes into contact and a recessed portion that is spaced apart from the end face such that the recessed portion is recessed from the contact face, and a gap is formed between the end face and the recessed portion, and the primary interior space is in communication with the exterior via the gap, and
the secondary frame member is internally provided with a secondary interior space.

2. The solar cell module according to claim 1, wherein the recessed portion is provided so as to include a position that a substantially vertical central portion of the end face faces.

3. The solar cell module according to claim 1, wherein the recessed portion is provided below a lower end of the contact face.

4. The solar cell module according to claim 3, wherein the recessed portion is formed so as to be chamfered obliquely downward from the lower end of the contact face.

5. The solar cell module according to claim 1, wherein the secondary frame member is provided with a through hole formed in the recessed portion so as to bring the secondary interior space into communication with the primary interior space.

6. The solar cell module according to claim 1, wherein the secondary frame member includes a through hole in a bottom portion thereof so as to bring the secondary interior space into communication with the exterior.

7. The solar cell module according to claim 1, wherein the secondary frame member is open on a side opposite to the contact face.

8. A solar cell module comprising a solar cell panel having a primary side and a secondary side adjacent to the primary side, a primary frame member disposed along the primary side, and a secondary frame member disposed along the secondary side,
wherein the primary frame member and the secondary frame member include a holding unit that holds the solar cell panel,
the primary frame member includes, below the holding unit of the primary frame member, an end face that is open at an end portion in a lengthwise direction of the primary frame member and a primary interior space communicating with the interior from the opening of the end face,
the secondary frame member includes, below the holding unit of the secondary frame member, a contact face with which the end face comes into contact and a recessed portion that is spaced apart from the end face such that the recessed portion is recessed from the contact face,
a gap is formed between the end face and the recessed portion, and the primary interior space is in communication with the exterior via the gap, and
an end portion of the recessed portion is covered by the primary frame member so as to avoid exposure of the gap to an exterior face of the solar cell module.

9. The solar cell module according to claim 8, wherein the contact face is provided at least above and below the recessed portion.

* * * * *